US008854323B2

(12) United States Patent (10) Patent No.: US 8,854,323 B2
Harada et al. (45) Date of Patent: Oct. 7, 2014

(54) OPERATING APPARATUS, OPERATING METHOD, PROGRAM, RECORDING MEDIUM, AND INTEGRATED CIRCUIT

(75) Inventors: Kumi Harada, Osaka (JP); Yoshihiro Kojima, Hyogo (JP); Masaki Yamauchi, Osaka (JP); Tomonari Takahashi, Osaka (JP); Yoichi Ikeda, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 313 days.

(21) Appl. No.: 13/377,832

(22) PCT Filed: Apr. 25, 2011

(86) PCT No.: PCT/JP2011/002409
§ 371 (c)(1),
(2), (4) Date: Dec. 13, 2011

(87) PCT Pub. No.: WO2011/145276
PCT Pub. Date: Nov. 24, 2011

(65) Prior Publication Data
US 2012/0092299 A1 Apr. 19, 2012

(30) Foreign Application Priority Data

May 20, 2010 (JP) ................................. 2010-116758

(51) Int. Cl.
*G06F 3/041* (2006.01)
*H04N 5/445* (2011.01)
*H04N 21/431* (2011.01)
*G06F 3/0488* (2013.01)
*H04N 21/422* (2011.01)
*H04N 5/44* (2011.01)

(52) U.S. Cl.
CPC ........ *G06F 3/04883* (2013.01); *H04N 5/44591* (2013.01); *H04N 2005/443* (2013.01); *H04N 21/4316* (2013.01); *H04N 5/4403* (2013.01); *H04N 5/44582* (2013.01); *G06F 2203/04808* (2013.01); *H04N 21/42224* (2013.01)
USPC .......................................... 345/173; 345/156

(58) Field of Classification Search
CPC ............... G06F 2203/04808; H04N 2005/443; H04N 21/42224; H04N 5/44591
USPC .................................................. 345/156–174
See application file for complete search history.

(56) References Cited

U.S. PATENT DOCUMENTS

| 6,239,789 | B1 | 5/2001 | Sekizawa et al. | |
|---|---|---|---|---|
| 2006/0197750 | A1* | 9/2006 | Kerr et al. | 345/173 |
| 2006/0197753 | A1* | 9/2006 | Hotelling | 345/173 |
| 2007/0195064 | A1* | 8/2007 | Morioka | 345/173 |
| 2009/0007001 | A1 | 1/2009 | Morin et al. | |
| 2010/0103136 | A1* | 4/2010 | Ono et al. | 345/173 |
| 2010/0164897 | A1 | 7/2010 | Morin et al. | |
| 2010/0185971 | A1* | 7/2010 | Ito | 715/773 |

FOREIGN PATENT DOCUMENTS

| JP | 11-143623 | 5/1999 |
|---|---|---|
| WO | 2008/152679 | 12/2008 |
| WO | 2009/006221 | 1/2009 |

OTHER PUBLICATIONS

International Search Report issued May 31, 2011 in International (PCT) Application No. PCT/JP2011/002409.

* cited by examiner

*Primary Examiner* — Viet Pham
(74) *Attorney, Agent, or Firm* — Wenderoth, Lind & Ponack, L.L.P.

(57) ABSTRACT

An operating apparatus (200) which includes: an operation information obtaining unit (204) which obtains, from an input apparatus (203), operation information indicating operations inputted by a user to first and second input units (201 and 202); an operation amount calculation unit (205) which calculates amounts of the operations by the user to the first and second input units (201 and 202), using the operation information obtained by the operation information obtaining unit (204); and an operation region change unit (215) which changes sizes of first and second operation regions (301 and 302) so that areas of the first and second operation regions (301 and 302) corresponding to the first and second input units (201 and 202) increase as the amounts of the operations to the first and second input units (201 and 202) calculated by the operation amount calculation unit are greater.

18 Claims, 19 Drawing Sheets

Operation information of first input unit

| Time | Position coordinates | Touch strength |
|---|---|---|
| $t_0$ | — | 0 |
| $t_1$ | (88, 157) | 11 |
| $t_2$ | (89, 156) | 13 |
| $t_3$ | (92, 150) | 20 |
| $t_4$ | (95, 145) | 23 |

Operation information of second input unit

| Time | Position coordinates | Touch strength |
|---|---|---|
| $t_0$ | — | 0 |
| $t_1$ | (43, 277) | 55 |
| $t_2$ | (40, 275) | 58 |
| $t_3$ | (41, 270) | 70 |
| $t_4$ | (36, 266) | 77 |

FIG. 8A

Amount of operation of first input unit

| Duration | Time | Amount of operation |
|---|---|---|
| $\Delta T_1$ | $t_1 - t_0$ | — |
| $\Delta T_2$ | $t_2 - t_1$ | 26 |
| $\Delta T_3$ | $t_3 - t_2$ | 83.5 |
| $\Delta T_4$ | $t_4 - t_3$ | 81.5 |

FIG. 8B

Amount of operation of second input unit

| Duration | Time | Amount of operation |
|---|---|---|
| $\Delta T_1$ | $t_1 - t_0$ | — |
| $\Delta T_2$ | $t_2 - t_1$ | 86.5 |
| $\Delta T_3$ | $t_3 - t_2$ | 115.0 |
| $\Delta T_4$ | $t_4 - t_3$ | 137.5 |

FIG. 10A

State of operation of first input unit

| Duration | Time | State of operation |
|---|---|---|
| ΔT1 | t1 - t0 | Operation OFF state |
| ΔT2 | t2 - t1 | Operation OFF state |
| ΔT3 | t3 - t2 | Operation OFF state |
| ΔT4 | t4 - t3 | Operation OFF state |

FIG. 10B

State of operation of second input unit

| Duration | Time | State of operation |
|---|---|---|
| ΔT1 | t1 - t0 | Operation OFF state |
| ΔT2 | t2 - t1 | Operation OFF state |
| ΔT3 | t3 - t2 | Operation ON state |
| ΔT4 | t4 - t3 | Operation ON state |

Determination result on update of parameter of first input unit

| Duration | Time | State of operation | Determination result on update of operation region parameter |
|---|---|---|---|
| ΔT1 | t1 - t0 | Operation OFF state | Do not update |
| ΔT2 | t2 - t1 | Operation OFF state | Do not update |
| ΔT3 | t3 - t2 | Operation OFF state | Do not update |
| ΔT4 | t4 - t3 | Operation OFF state | Do not update |

Determination result on update of parameter of second input unit

| Duration | Time | State of operation | Determination result on update of operation region parameter |
|---|---|---|---|
| ΔT1 | t1 - t0 | Operation OFF state | Do not update |
| ΔT2 | t2 - t1 | Operation OFF state | Do not update |
| ΔT3 | t3 - t2 | Operation ON state | Update |
| ΔT4 | t4 - t3 | Operation ON state | Do not update |

FIG. 14A

Operation-region-state parameter of first input unit

| Duration | Time | State of operation | Determination result on update of operation region parameter | Operation-region-state parameter |
|---|---|---|---|---|
| ΔT1 | t1 - t0 | Operation OFF state | Do not update | Invalid state |
| ΔT2 | t2 - t1 | Operation OFF state | Do not update | Invalid state |
| ΔT3 | t3 - t2 | Operation OFF state | Do not update | Invalid state |
| ΔT4 | t4 - t3 | Operation OFF state | Do not update | Invalid state |

FIG. 14B

Operation-region-state parameter of second input unit

| Duration | Time | State of operation | Determination result on update of operation region parameter | Operation-region-state parameter |
|---|---|---|---|---|
| ΔT1 | t1 - t0 | Operation OFF state | Do not update | Invalid state |
| ΔT2 | t2 - t1 | Operation OFF state | Do not update | Invalid state |
| ΔT3 | t3 - t2 | Operation ON state | Update | Valid state |
| ΔT4 | t4 - t3 | Operation ON state | Do not update | Valid state |

FIG. 16A

Operation-region-state parameter
First input unit = valid state
Second input unit = valid state

| First operation region | Second operation region |
|---|---|

↑ Whole operation region

| Input unit | Top-left corner coordinates of operation region | Bottom-right corner coordinates of operation region |
|---|---|---|
| First | (0, 0) | (0, 0) |
| Second | (800, 0) | (1600, 900) |

FIG. 16B

Operation-region-state parameter
First input unit = valid state
Second input unit = invalid state First operation region = whole operation region

| Input unit | Top-left corner coordinates of operation region | Bottom-right corner coordinates of operation region |
|---|---|---|
| First | (0, 0) | (1600, 900) |
| Second | None | None |

FIG. 16C

Operation-region-state parameter
First input unit = invalid state
Second input unit = valid state Second operation region = whole operation region

| Input unit | Top-left corner coordinates of operation region | Bottom-right corner coordinates of operation region |
|---|---|---|
| First | None | None |
| Second | (0, 0) | (1600, 900) |

FIG. 16D

Operation-region-state parameter
First input unit = invalid state
Second input unit = invalid state Do not allocate operation regions for any of touchpads ↑ Whole operation region

| Input unit | Top-left corner coordinates of operation region | Bottom-right corner coordinates of operation region |
|---|---|---|
| First | None | None |
| Second | None | None |

FIG. 17

| Method for describing presentation | Before update | After update |
|---|---|---|
| | First operation region \| Second operation region | Second operation region |
| (a) Popup | First input unit 201 is to be invalidated | |
| (b) Guide | | |
| (c) Border of operation regions | | |
| (d) Color background of operation region | | |

FIG. 20B
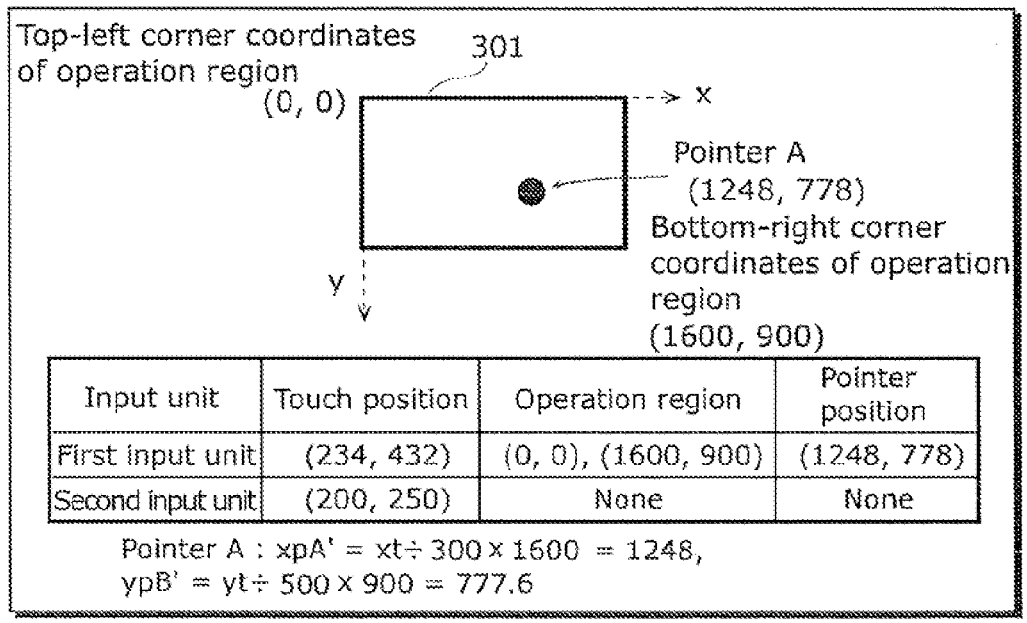
FIG. 21A
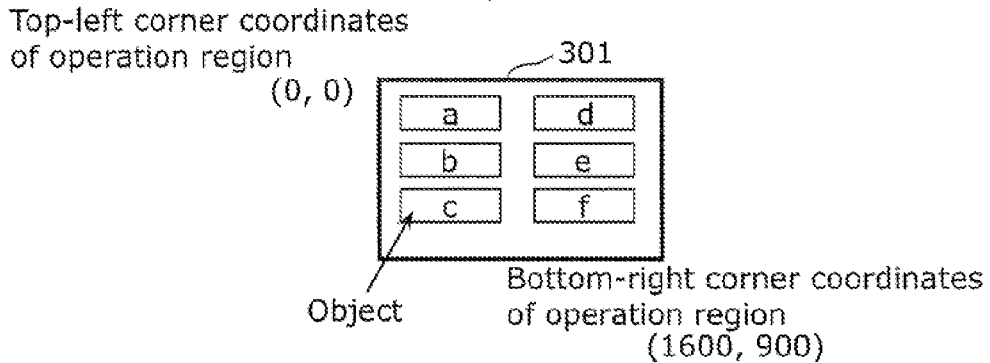
FIG. 21B
| Object | Top-left corner coordinates of operation region | Bottom-right corner coordinates of operation region |
|---|---|---|
| a | (50, 50) | (750, 250) |
| b | (50, 300) | (750, 500) |
| c | (50, 550) | (750, 750) |
| d | (850, 50) | (1750, 50) |
| e | (850, 300) | (1750, 300) |
| f | (850, 550) | (1750, 750) |
*Object is rectangle

OPERATING APPARATUS, OPERATING METHOD, PROGRAM, RECORDING MEDIUM, AND INTEGRATED CIRCUIT

TECHNICAL FIELD

The present invention relates to an operating apparatus for operating a Graphical User Interface (hereinafter referred to as GUI) on a display screen using input devices.

BACKGROUND ART

Along with the increase in size and improvement in performance of a display screen, a TV has been used not only for simply watching a broadcasting program or a movie but also for, for example, browsing a wide variety of information through the connection to the Internet, linking with a device connected to a network at home, or executing various applications for viewing a photo or playing a game.

In view of such a situation, development of an operating apparatus which allows a user to perform an input operation with a higher degree of freedom and with more intuition will become essential in addition to a conventionally known typical input device including buttons, in order to operate multiple and diverse functions and applications expected to be developed further.

A pointing device is an input device which can specify a given position or a direction by controlling a pointer or a cursor indicated on the display screen. Examples of the pointing devices are, a touchpad, a trackball, a joystick, and a mouse. As compared to the input device configured with buttons only, the pointing device allows a more intuitive and easy direction of a given position and selection of a menu or an object, regardless of the structure of the GUI and content of application. Therefore, in recent years, many pointing devices have been mounted with, for example, a mobile phone, an AV apparatus, and a game machine.

Among them, the touchpad is characterized by intuition, which allows a user to operate by directly touching the touchpad itself. Along with an improvement of a sensing technology for the touchpad, a touchpad is under development which allows the user a high-level input operation such as to operate not only with one finger but also with a gesture concurrently using two fingers. More specifically, the touchpad can be operated not only with one hand but also with both hands. Furthermore, there is a method to implement an operation that is high in the degree of freedom by mounting touchpads on a single operating apparatus. Such an operation allows the user to perform operation of various kinds or high in the degree of freedom quickly and in a short time as compared to the case where the user operates a single touchpad with one finger. Accordingly, the touchpad is expected to continue to be applied to more and more information apparatuses and home appliances, as an input device.

The PTL 1 discloses a remote control for a home appliance mounted with a touchpad. The remote control disclosed in the PTL 1 includes a touchpad on its chassis, and the touchpad is used to operate an object on a display screen. More specifically, the touchpad corresponds to operation regions on the display screen and an operation on the touchpad can be reflected on the operation region.

Furthermore, the touchpad can concurrently detect equal to or more than two touches, thereby allow an operation using both hands concurrently. In addition, it is possible to adaptively change the correspondence between input regions on the touchpad and the operation regions on the display screen, depending on the location of the object on the display screen, the direction of the chassis held by the user, or an application.

As an example, when a keyboard displayed on the display screen is operated using the touchpad, the left-half input region of the touchpad is allocated to the left-half region of the keyboard on the display screen, and the right-half input region of the touchpad is allocated to the right-half region of the keyboard on the display screen. As another example, when a word prediction list (a word list) is further displayed on the display screen, it is possible to allocate the left-half of the input region of the touchpad to the operation performed on the word list, and the right-half of the input region of the touchpad to operation performed on the whole region of the keyboard on the display screen.

CITATION LIST

Patent Literature

[PTL 1] PCT International Publication No. WO 2009/006221

SUMMARY OF INVENTION

Technical Problem

However, the user always has to operate the remote control having such an allocation with both hands because the correspondence between the touchpad and the operation regions is fixed. This leads to a case that the user feels inconvenience because the user has to perform a complex operation with a non-dominant hand or the operation is restricted when one of the hands is full.

The present invention has been conceived in view of the above-described problems and aims to provide an operating apparatus capable of dynamically changing the correspondence between the input units and the operation regions based on states of operations of the input units.

Solution to Problem

An operating apparatus according to an embodiment of the present invention reflects an operation, inputted by a user to each of input units of an input apparatus, on each of operation regions that corresponds to each of the input units, where the operation regions occupy predetermined areas on a display screen of a display apparatus. More specifically, the operating apparatus includes (i) an operation information obtaining unit which obtains, from the input apparatus, operation information indicating the operation inputted by the user to each of the input units, (ii) an operation amount calculation unit which calculates an amount of the operation by the user to each of the input units, using the operation information obtained by the operation information obtaining unit, and (iii) an operation region change unit which changes a size of each of the operation regions so that an area of an operation region corresponding to an input unit increases as the amount of the operation to the input unit calculated by the operation amount calculation unit is greater.

The above structure enables to provide a comfortable operating environment to the user, since the size of the operation region is dynamically changed according to the amount of the operation to the input unit to which the operation region is corresponding. For example, when the user is operating using a plurality of input units concurrently, it is possible to equally allocate the operation regions to the input units, and when the user is operating using a specific input unit, it is possible to allocate a large operation region to the input unit.

Furthermore, the operation region change unit may change, when the amount of the operation to the input unit is below a predetermined threshold, an area of the operation region corresponding to the input unit to 0. This allows, for example, the operation region change unit not to determine a touch by the user as an input operation, thereby prevent an operation that is not intended by the user from being performed, in the case where a left hand of the user touches the input unit when the user is holding the input unit with the left hand and operating the input unit with a right hand only.

Furthermore, the operation region change unit may change the size of each of the operation regions so that a ratio of the area of each of the operation regions approximates a ratio of the amount of the operation to each of the input units to which each of the operation regions are corresponding. This enables to provide a more comfortable operating environment to the user.

Furthermore, the operation amount calculation unit may (i) calculate, based on the operation information, operational characteristics that are different in properties from each other, and (ii) calculate, as the amount of the operation, a weighted linear sum using predetermined weighting coefficients and the operational characteristics as a parameter. This enables to estimate an intention and circumstances of the user more appropriately.

Furthermore, the input unit may include an input region which occupies a predetermined area, and may be a touch sensor that outputs, as the operation information, at least one of (i) position coordinates of a position and (ii) a touch strength at the position, on the input region, of a touch by the user on the input region. The operation amount calculation unit may calculate, as the operational characteristic, (i) at least one of a moving distance, a moving velocity, a moving acceleration velocity, and an operation direction, based on the position coordinates, or (ii) an average strength based on the touch strength. The above is an example of the operational characteristic, and the present invention is not limited to the above example.

As an example, the touch sensor may be of a capacitance type. The touch strength may be a capacitance value obtained when a finger of the user touches or approaches the touch sensor. As another example, the touch sensor may be of a pressure-sensitive type. The touch strength may be a pressure value obtained when a finger of the user presses the touch sensor.

Furthermore, the operating apparatus may include (i) an operation amount storage unit which stores the amount of the operation calculated by the operation amount calculation unit, (ii) an operation state determination unit which determines, based on the amount of the operation stored in the operation amount storage unit, the state of the operation of the input unit to which the operation region is corresponding, and (iii) an operation state storage unit which stores a result of determination by the operation state determination unit. The operation state determination unit determines (i) that the input unit to which the operation region is corresponding is in an operation OFF state indicating that the input unit is not being operated, when the amount of the operation is below the predetermined threshold, and (ii) that the input unit to which the operation region is corresponding is in an operation ON state indicating that the corresponding input unit is being operated, when the amount of the operation is equal to or greater than the predetermined threshold.

Furthermore, the operating apparatus may include (i) a parameter-update-condition determination unit which determines whether or not an update of an operation-region-state parameter is required, based on the result of determination by the operation state determination unit, where the operation-region-state parameter indicates whether or not the operation inputted by the user to the input apparatus is to be reflected on the corresponding operation region or not (ii) and an operation-region-state parameter update unit which updates the operation-region-state parameter based on the result of determination by the operation state determination unit, when it is determined by the parameter-update-condition determination unit that the update of the operation-region-state parameter is required. The parameter-update-condition determination unit may determine that the update of the operation-region-state parameter is required, when results of current and past determination by the operation state determination unit are different. The operation-region-state parameter update unit may set: (i) the operation-region-state parameter to a valid state indicating that the input to the input apparatus is to be reflected on the corresponding operation region, when the current result of determination indicates the operation ON state, and (ii) the operation-region-state parameter to an invalid state indicating that the input to the input apparatus is not to be reflected on the corresponding operation region, when the current result of determination indicates the operation OFF state.

Furthermore, the operating apparatus may include an operation-region-attribution parameter update unit which updates the operation-region-attribution parameter that includes information indicating at least the area of the operation region, according to a value of the operation-region-state parameter updated by the in operation-region-state parameter update unit. The operation-region-attribution parameter update unit may update the operation-region-attribution parameter so that the area of the operation region having the operation-region-state parameter set to the valid state, out of the operation regions, is greater than the area of the operation region having the operation-region-state parameter set to the invalid state. The operation region change unit may change the size of each of the operation regions according to the values of the operation-region-attribution parameter updated by the operation-region-attribution parameter update unit. Furthermore, the operation-region-attribution parameter may include information indicating (i) a shape, (ii) a position on the display screen, and (iii) a method of changing an area, the shape and the position, of the operation region.

Furthermore, the operating apparatus may include an operation-region-change presentation unit which notifies the user content of the operation-region-attribution parameter updated by the operation-region-attribution parameter update unit. This prevents the user from continuing operation without knowing the change of the size of the operation region, thereby preventing the user from having uncomfortable feeling for the case where an intended operation is not reflected on the operation region correctly.

Furthermore, the operating apparatus may include a pointer position determination unit which has the display apparatus display a pointer, on a position on the operation region corresponding to the position touched by the user on the input unit, based on the ratio of the area of the operation region indicated in the operation-region-attribution parameter and the area of the input unit corresponding to the indicated operation region.

As an example, the operating apparatus may further include the input apparatus. The input apparatus may include a chassis and the input units located side by side on a same surface of the chassis. As another example, the operating apparatus may further include the display apparatus.

The operating method according to the embodiment of the present invention is a method of reflecting an operation, inputted by a user to each of input units of an input apparatus, on each of operation regions that corresponds to each of the input units, where the operation regions occupy predetermined areas on a display screen of a display apparatus. The operating method includes (i) obtaining, from the input apparatus, operation information indicating the operations inputted by the user to each of the input units, (ii) calculating an amount of the operation by the user to each of the input units, using the operation information obtained in the obtaining, and (iii) changing a size of each of the operation regions so that an area of the operation region corresponding to the input unit increases as the amount of the operation to the input unit calculated in the calculating is greater.

Advantageous Effects of Invention

The present invention enables to dynamically change the correspondence between the input units and the operation regions based on the operation information outputted from each of the input units. In other words, the present invention enables to have a larger operation region correspond to the input unit having a large amount of the operation by determining that (i) the user performs the input operation intentionally for the input unit having the large amount of the operation and (ii) the user performs the input operation unintentionally (or performs a wrong operation) for an input unit having a small amount of the operation.

Therefore, although the fixed correspondence between the input units and operation regions in the conventional invention has a case that forces the user to perform a complex operation with his or her non-dominant hand, the present invention enables the user to operate almost all the operation regions on the display screen with the dominant hand by, for example, stopping an operation with the non-dominant hand and reducing the amount of the operation.

Equally, although the operation in an operation region corresponding to a hand has been impossible when the user can't use the hand for the operation in the conventional invention, the present invention automatically allows the user to operate the whole operation region using another hand because little amount of operation with the hand is involved.

As described above, the present invention provides a more comfortable operating environment to the user by automatically changing the correspondence between the input units and the operation regions based on an amount of use of the right and left hands of the user.

The program according to the embodiment of the present invention has a computer execute a process of reflecting an operation, inputted by a user to each of input units of an input apparatus, on each of operation regions that corresponds to each of the input units, where the operation regions occupy predetermined areas on a display screen of a display apparatus. More specifically, the program has the computer execute (i) obtaining, from the input apparatus, operation information indicating the operations inputted by the user to each of the input units, (ii) calculating an amount of the operation by the user to each of the input units, using the operation information obtained in the obtaining, and (iii) changing a size of each of the operation regions so that an area of the operation region corresponding to the input unit increases as the amount of the operation to the input unit calculated in the calculating is greater.

In a non-transitory computer-readable recording medium for use in a computer according to the embodiment of the present invention, the above described program is recorded.

The integrated circuit according to the embodiment of the present invention reflects an operation, inputted by a user to each of input units of an input apparatus, on each of a plurality of operation regions that corresponds to each of the input units, where the operation regions occupy predetermined areas on a display screen of a display apparatus. More specifically, the integrated circuit includes (i) an operation information obtaining unit which obtains, from the input apparatus, operation information indicating the operations inputted by the user to each of the input units, (ii) an operation amount calculation unit which calculates an amount of the operation by the user to each of the input units, using the operation information obtained by the operation information obtaining unit, and (iii) an operation region change unit which changes a size of each of the operation regions so that an area of the operation region corresponding to the input unit increases as the amount of the operation to the input unit calculated by the operation amount calculation unit is greater.

BRIEF DESCRIPTION OF DRAWINGS

FIG. 8A shows an example of the amount of the operation of the first input unit which is stored in an operation amount storage unit.

FIG. 8B shows an example of the amount of the operation of the second input unit which is stored in the operation amount storage unit.

FIG. 10A shows an example of the state of the operation of the first input unit which is stored in the operation amount storage unit.

FIG. 10B shows an example of the state of the operation of the second input unit which is stored in the operation amount storage unit.

FIG. 14A shows an example of the operation-region-state parameter of the first input unit.

FIG. 14B shows an example of the operation-region-state parameter of the second input unit.

FIG. 16A shows a relationship between the operation region and the input region when the first input unit is in a "valid state" and the second input unit is in the "valid state".

FIG. 16B shows a relationship between the operation region and the input region when the first input unit is in the "valid state" while the second input unit is in an "invalid state".

FIG. 16C shows a relationship between the operation region and the input region when the first input unit is in the "invalid state" while the second input unit is in the "valid state".

FIG. 16D shows a relationship between the operation region and the input region when the first input unit is in the "invalid state" and the second input unit is in the "invalid state".

FIG. 17 shows an example of a method for presenting a change of the operation region according to the embodiment of the present invention.

FIG. 20B shows an example of a relationship between the touch position and the pointer position when the first input unit is in the "valid state" and the second input unit is in the "invalid state".

FIG. 21A shows examples of objects a to f indicated on the operation region.

FIG. 21B shows the coordinates of the objects a to f on the operation region.

DESCRIPTION OF EMBODIMENT

An embodiment of the present invention is described below with reference to diagrams.
[Embodiment]

Figure 1:
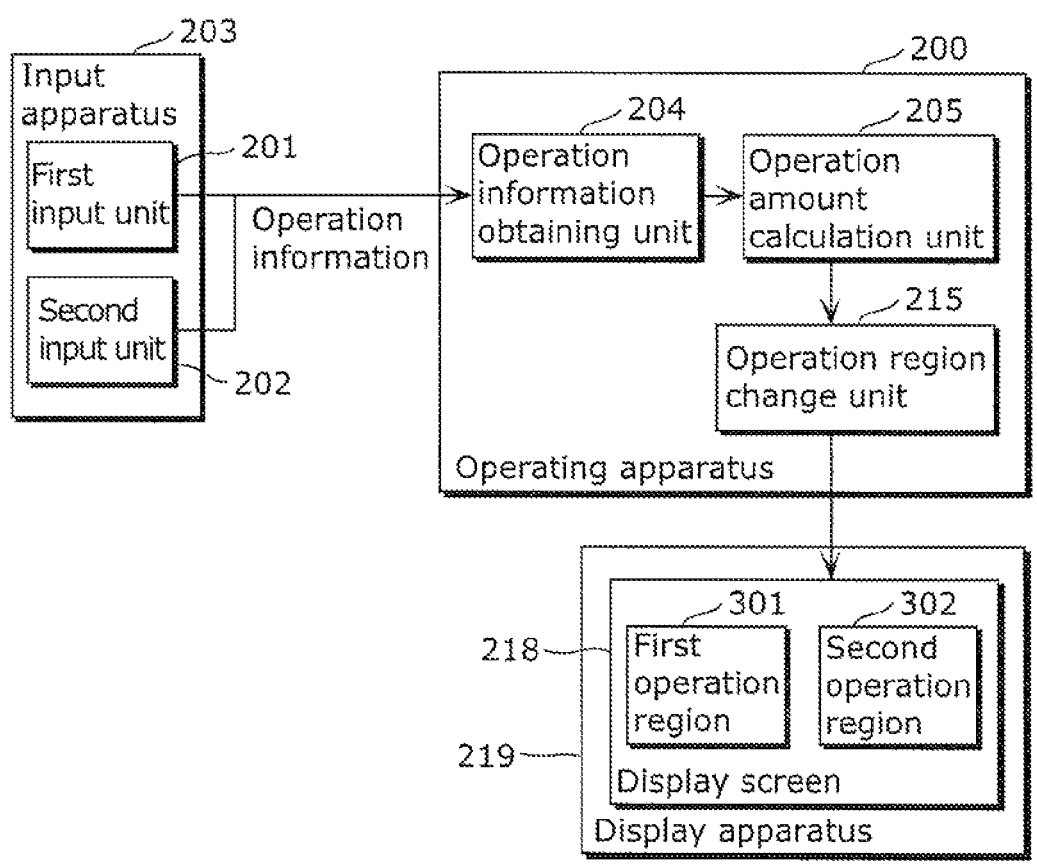
FIG. 1 is a block diagram showing a schematic configuration of an input apparatus, an operating apparatus, and a display apparatus according to an embodiment of the present invention.

FIG. 1 is a functional block diagram showing an operating apparatus 200, an input apparatus 203, and a display apparatus 219 according to an embodiment. The operating apparatus 200 according to the embodiment of the present invention is an apparatus which reflects an operation inputted by the user to a first input unit 201 and a second input unit 202, both of which are provided on an input apparatus 203, on operation regions on a display screen 218 provided on the display apparatus 219.

The input apparatus 203 includes input units, that is, the first input unit 201 and the second input unit 202, as shown in FIG. 1. The input apparatus 203 outputs, to the operating apparatus 200, the operation inputted by the user to the first input unit 201 and the operation inputted by the user to the second input unit 202, as operation information.

The operating apparatus 200 includes, at least an operation information obtaining unit 204, an operation amount calculation unit 205, and an operation region change unit 215, as shown in FIG. 1. The operating apparatus 200 is an apparatus which obtains the operation information from the input apparatus 203, calculates pointer position coordinates based on the operation information, and outputs the pointer position coordinates to the display apparatus 219.

The operation information obtaining unit 204 obtains, from the input apparatus 203, the operation information indicating operation inputted by the user to the first input unit 201 and the operation information indicating operation inputted by the user to the second input unit 202. The operation amount calculation unit 205 calculates the amount of operation inputted by the user to the first input unit 201 and the amount of operation inputted by the user to the second input unit 202, using the operation information obtained by the operation information obtaining unit 204. The operation region change unit 215 changes the sizes of each of the operation regions so that the area of the operation region corresponding to the input unit increases as the amount of the operation to the input unit calculated by the operation amount calculation unit 205 is greater.

The display apparatus 219 includes the display screen 218. The display apparatus 219 obtains the pointer position coordinates from the operating apparatus 200 and has the display apparatus 219 display, on the display screen 218, a pointer at a position indicated by the pointer position coordinates. The display screen 218 is divided into a first operation region 301 and a second operation region 302. The first operation region 301 corresponds to the first input unit 201. The first operation region 302 corresponds to the second input unit 201.

The first operation region 301 is a region occupying a predetermined area on the display screen 218 and corresponding to the first input unit 201. The operation inputted by the user to the first input unit 201 is reflected on the first operation region 301 according to a control by the operating apparatus 200. Equally, the second operation region 302 is a region occupying a predetermined area on the display screen 218 and corresponding to the second input unit 202. The operation inputted by the user to the second input unit 202 is reflected on the second operation region 302 according to an control by the operating apparatus 200.

Figure 2:
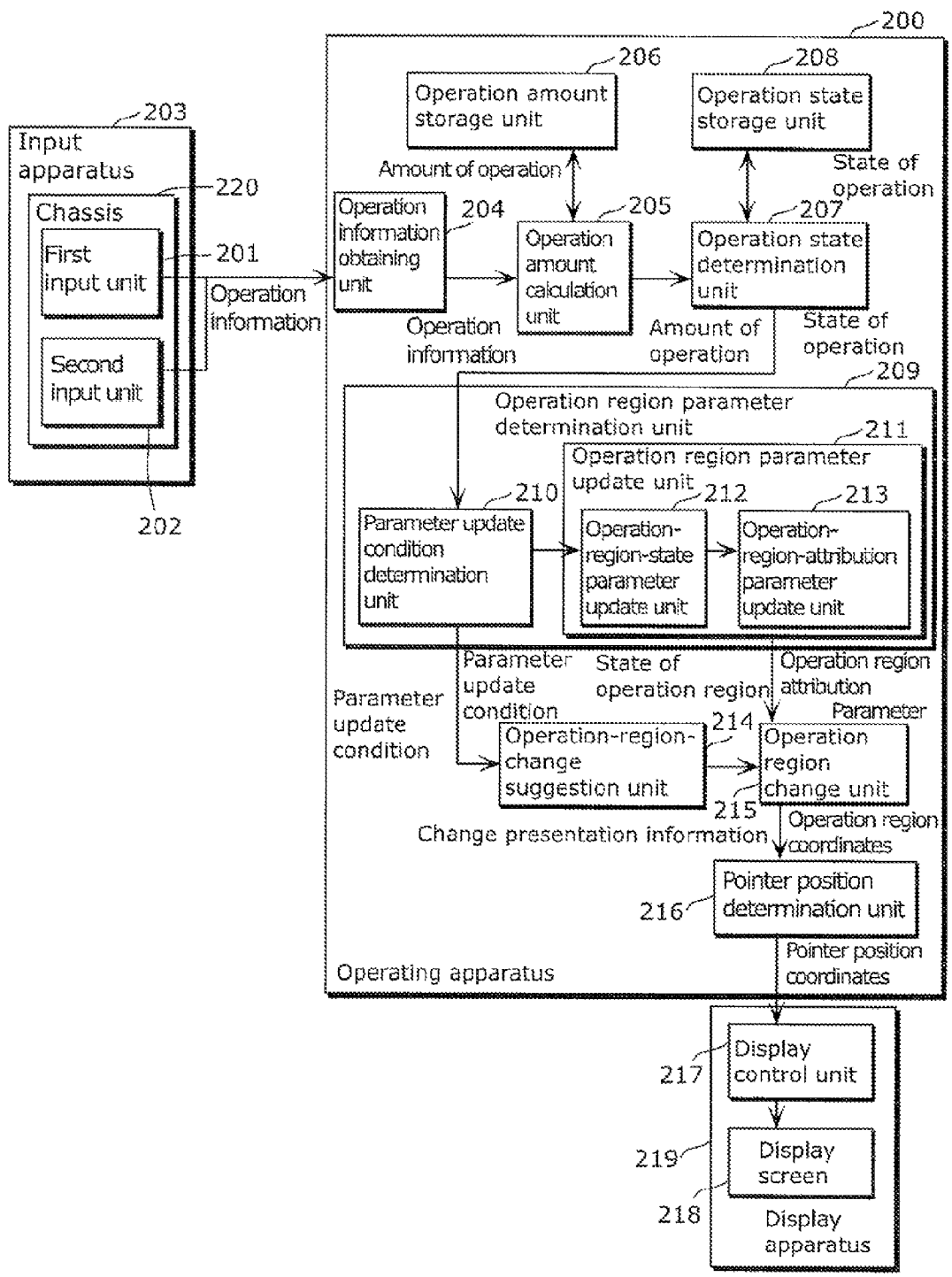
FIG. 2 is a block diagram showing a detailed configuration of the input apparatus, the operating apparatus, and the display apparatus according to the embodiment of the present invention.
Figure 3:
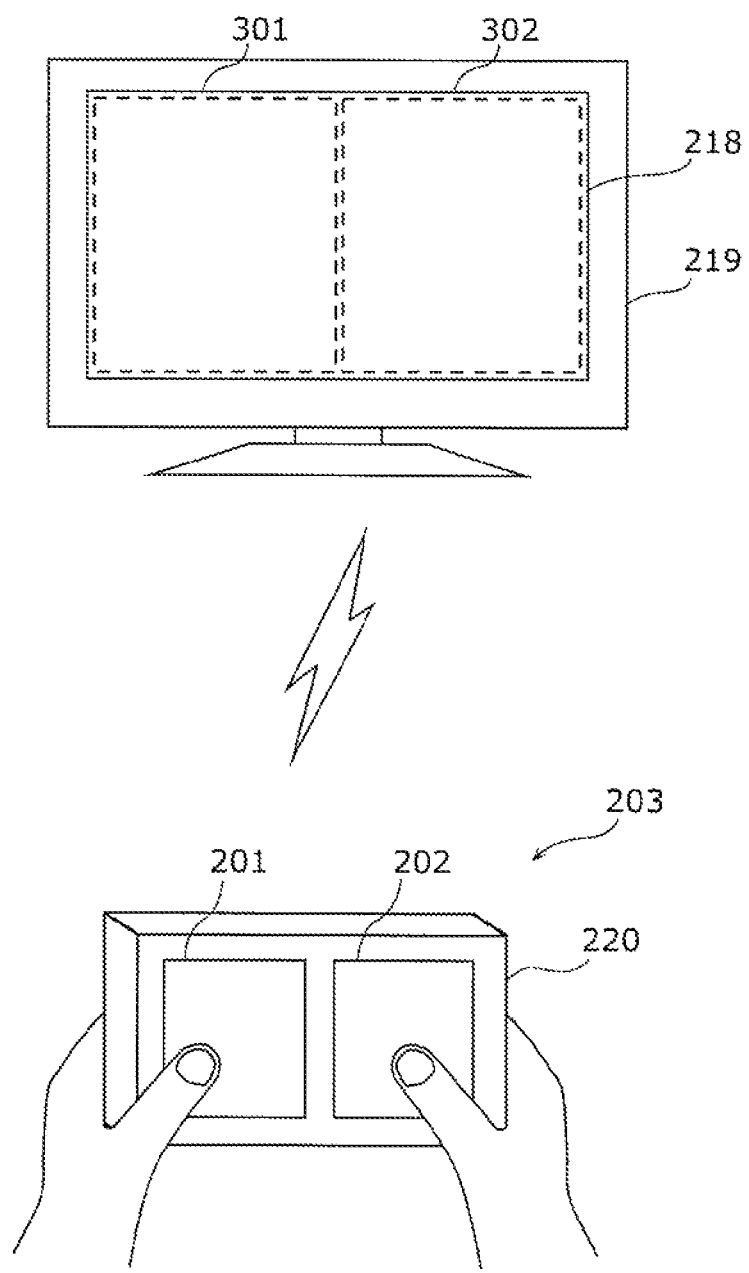
FIG. 3 shows an example of an outlook of the input apparatus and the display apparatus according to the embodiment of the present invention.
Figure 4A:
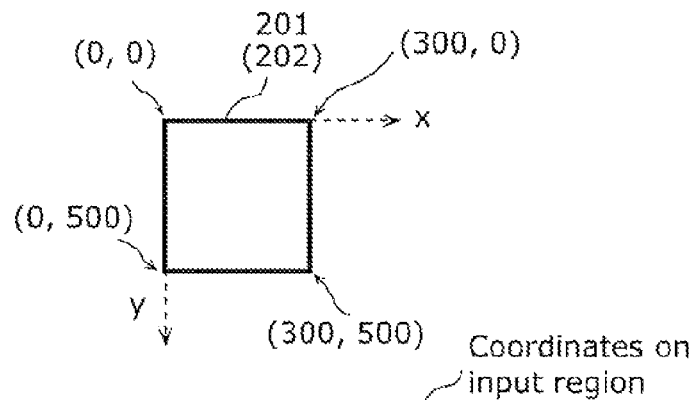
FIG. 4A shows position coordinates of an input region of a first input unit and an input region of a second input unit.
Figure 4B:
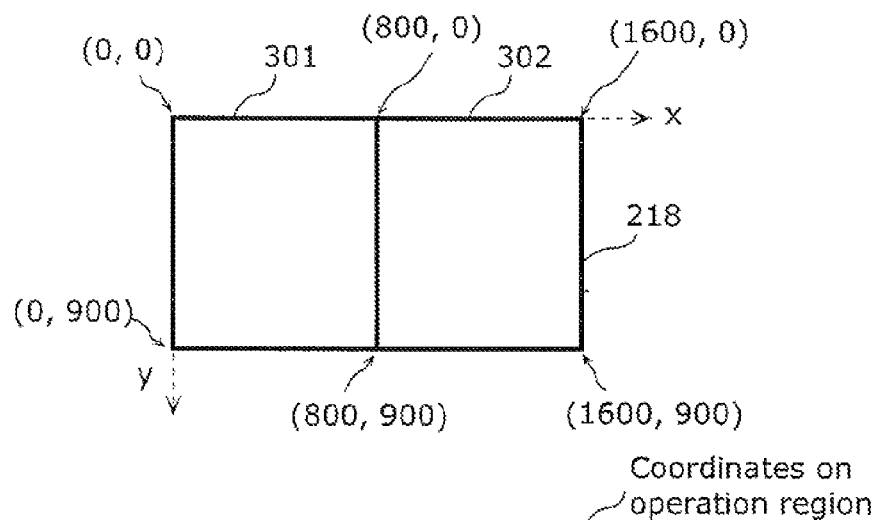
FIG. 4B shows position coordinates of a first operation region and a second operation region.

Details of the operating apparatus 200 according to the embodiment of the present invention is described below with reference to FIG. 2, FIG. 3, FIG. 4A, and FIG. 4B. FIG. 2 is a block diagram showing a detailed configuration of the input apparatus 203, the operating apparatus 200, and the display apparatus 219, according to the embodiment of the present invention. FIG. 3 shows an example of an outlook of the input apparatus 203 and the display apparatus 219, according to the embodiment of the present invention. FIG. 4A shows the position coordinates of an input region of the first input unit 201 and an input region of the second input unit 202. FIG. 4B shows position coordinates of the first input region 301 and the second input region 302. It is to be noted that the configurations common to FIG. 1 are allocated with the same reference numerals as in FIG. 1.

The input apparatus 203 includes a chassis 220, the first input unit 201, and the second input unit 202. The first input unit 201 and the second input unit 202 are located side by side on the same surface of the chassis 220, as shown in FIG. 3. The user operates an object on the display screen 218 of the display apparatus 219 by holding the chassis 220 with both hands and operating the first input unit 201 with the left hand while operating the second input unit 202 with the right hand.

The first input unit 201 outputs, in a predetermined time interval, the operation information indicating the operation by the user upon receiving the input generated by the operation performed by a finger or a hand of the user. The operation information is one or more pieces of information out of (i) position information of a position, (ii) time, and (iii) the touch strength at the position, of a touch by the user on the input region of the first input unit 201. The second input unit 202 is configured in same manner.

It is to be noted that a typical example of the first input unit 201 and the second input unit 202 is a touchpad having input regions occupying predetermined areas. The touchpad may be one of a capacitance type or a pressure-sensitive type. The user may touch the touchpad using a device, such as a pen, instead of the finger or the hand. It is to be noted that the touchpad may be a touch sensor which has a multipoint recognition function that is a function to detect inputs at a time. In this case, it is sufficient to provide one or more touch sensors with the chassis 220.

Furthermore, the chassis 220 may be provided with a structure such as a button or a switch having a function to determine an inputted operation. Alternatively, the touchpad itself may be a pressable touchpad which is capable of being pressed at a given touch position.

In addition, the touchpad is used as an example of the input unit, however, it is not limited to the touchpad and other pointing devices may be used. Examples of the pointing devices are input devices such as a mouse, a trackball, and a pen-shaped input device. It is to be noted that the description below is on the assumption that both of the first input unit 201 and the second input unit 202 are touchpads.

The operating apparatus 200 includes the operation information obtaining unit 204, the operation amount calculation unit 205, an operation amount storage unit 206, an operation state determination unit 207, an operation state storage unit 208, an operation region parameter determination unit 209, an operation-region-change presentation unit 214, the operation region change unit 215, and a pointer position determination unit 216. The operating apparatus 200 is an apparatus which obtains the operation information from the input apparatus 203, calculates pointer position coordinates based on the operation information, and outputs the pointer position coordinates to the display apparatus 219.

The operation information obtaining unit 204 obtains the operation information outputted from the first input unit 201 and the operation information outputted from the second input unit 202. A specific method to obtain the operation information is not limited, however, it is sufficient to, for example, transmit and receive the operation information by connecting the operation information obtaining unit 204 and the input apparatus 203 with a wire or wirelessly.

The operation amount calculation unit 205 calculates the amount of the operation inputted by the user to the first input unit 201 and the amount of the operation inputted by the user to the second input unit 202, using the operation information obtained by the operation information obtaining unit 204. The amount of the operation is calculated based on the operational characteristics such as a moving distance, a moving velocity, a moving acceleration velocity, and the average strength, of the hand or the finger of the user on the input region.

The operation amount storage unit 206 is a unit which stores the amount of the operation of the first input unit 201 and the amount of the operation of the second input unit 202 calculated by the operation amount calculation unit 205. It is to be noted that the storage medium is not limited to a specific example, and every storage medium in which data can be stored, such as a Dynamic Random Access Memory (DRAM), a Static Random Access Memory, a flash memory, and a Hard Disc Drive (HDD) may be adopted.

The operation state determination unit 207 determines the state of the operation by the user to the first input unit 201 and the state of the operation by the user to the second input unit 202, using the amount of the operation in the predetermined time interval stored in the operation amount storage unit 206. The state of the operation by the user to the first input unit 201 is one of (i) an "operation ON state" indicating that the user is operating the first input unit 201 and (ii) an "operation OFF state" indicating that the user is not operating the first input unit 201. The state of the operation by the user to the second input unit 202 is one of (i) an "operation ON state" indicating that the user is operating the second input unit 202 and (ii) an "operation OFF state" indicating that the user is not operating the second input unit 202.

The operation state storage unit 208 is a unit which stores the state of the operation of the first input unit 201 and the state of the operation of the second input unit 202 obtained by the operation state determination unit 207, in a predetermined time interval. A specific example of the storage medium is common to the operation amount storage unit 206.

The operation region parameter determination unit 209 includes a parameter-update-condition determination unit 210 and an operation region parameter update unit 211. Furthermore, the operation region parameter update unit 211 includes an operation-region-state parameter update unit 212 and an operation-region-attribution parameter update unit 213. The operation region parameter determination unit 209 determines parameters relevant to the operation region, on the display screen 218, corresponding to the input region of the first input unit 201, based on the state of the operation by the user of the first input unit 201 determined by the operation state determination unit 207, and parameters relevant to the operation region, on the display screen 218, corresponding to the input region of the second input unit 202, based on the state of the operation by the user of the second input unit 202 determined by the operation state determination unit 207.

An operation-region-parameter of the first input unit 201 includes (i) an operation-region-state parameter indicating the state of the first operation region 301 corresponding to the first input unit 201 and (ii) an operation-region-attribution parameter indicating an attribution of the first operation region 301. An operation-region-parameter of the second input unit 202 includes (i) an operation-region-state parameter indicating the state of the second operation region 302 corresponding to the second input unit 202 and (ii) an operation-region-attribution parameter indicating an attribution of the second operation region 302 The operation-region-state parameter is set to one of (i) a "valid state" indicating that the input to the input region is to be reflected on the corresponding operation region or (ii) an "invalid state" indicating that the input to the input region is not to be reflected on the corresponding operation region. Furthermore, the operation-region-attribution parameter includes one or more pieces of information out of the area, the shape, the location (the position on the operation region) of the operation region. In addition, the operation-region-attribution parameter may include the changing velocity as well as the changing method of the area, the shape, and the location, of the operation region.

The parameter-update-condition determination unit 210 determines one of "to update" and "not to update" the operation region parameter, based on the history of the state of the operation by the user during every predetermined time stored in the operation state storage unit 208. More specifically, the parameter-update-condition determination unit 210 compares a present (current) state of the operation with a past state of the operation, and determines "to update" the operation region parameter when the states are different and "not to update" when the states are the same.

The operation-region-state parameter update unit 212 updates the operation-region-state parameter based on the current state of the operation, when the parameter-update-condition determination unit 210 determines "to update" the operation region parameter. The operation-region-state parameter update unit 212 sets (i) an operation-region-state parameter corresponding to the "operation ON state" to "valid state", when the current state of the operation stored in the operation state storage unit 208 is the "operation ON state", and (ii) an operation-region-state parameter corresponding to the "operation OFF state" to "invalid state", when the current state of the operation is the "operation OFF state".

The operation-region-attribution parameter update unit 213 updates the operation-region-attribution parameter of the first input unit 201, based on the operation-region-state parameter of the first input unit 201 updated by the operation-region-state parameter update unit 212 and the operation-region-attribution parameter of the second input unit 202, based on the operation-region-state parameter of the second input unit 202 updated by the operation-region-state parameter update unit 212. When at least one of the operation-region-state parameters of the first input unit 201 and the second input unit 202 is set to the "invalid state", the operation-region-attribution parameter update unit 213 updates the operation-region-attribution parameter of the other unit. For example, the operation-region-attribution parameter update unit 213 updates the operation-region-attribution parameter so that the area of the operation region having the operation-region-state parameter set to the valid state, out of the first operation region 301 and the second operation region 302, is greater than the area of the operation region having the operation-region-state parameter set to the invalid state.

The operation-region-change presentation unit 214 presents (notifies) the user that the correspondence between the input region and the operation region is to be changed, when it is determined "to update" the operation region parameter by the parameter-update-condition determination unit 210.

The operation region change unit 215 changes, based on the updated operation region parameter, the correspondence between the first input unit 201 and the first operation region 301 and the correspondence between the second input unit 202 and the second operation region 302, respectively, when it is determined "to update" the operation region parameter by the parameter-update-condition determination unit 210.

The pointer position determination unit 216 determines (i) a pointer position corresponding to position information of the first input, unit 201, or an object pointed by the pointer position, on the display screen 218, based on the position information included in the operation information of the first input unit 201 and the operation region parameter of the first input unit 201 changed by the operation region change unit 215, and (ii) a pointer position corresponding to position information of the second input unit 202 or an object pointed by the pointer position, on the display screen 218, based on the position information included in the operation information of the second input unit 202 and the operation region parameter of the second input unit 202 changed by the operation region change unit 215. More specifically, the pointer position determination unit 216 determines a position of the pointer so that the pointer is indicated at a position, on the operation region, corresponding to a position on the input region that the user has touched, based on the ratio of the areas of the first operation region 301 and the second operation region 302 and the areas of the first input unit 201 and the second input unit 202, as shown in FIGS. 4A and 4B.

The display apparatus 219 includes a display screen 217 and the display screen 218.

The display screen 217 outputs, to the display screen 218, control information for displaying a GUI screen on the display screen 218, based on the result outputted from the operation-region-change presentation unit 214, the operation region change unit 215, and the pointer position determination unit 216.

The display screen 218 displays the GUI screen based on the control information for the GUI screen outputted from the display screen 217. In other words, in response to the operation by the user that is to move the finger or the hand on the input region of the first input unit 201 and the input region of the second input unit 202, the display screen 218, for example, displays a pointer to be operated, or highlights an object pointed by the pointer so that the user can distinguish the object from other objects, and displays a process or result of operation of, for example, a menu or an icon, such as writing letters or drawing a picture.

The first operation region 301 corresponding to the first input unit 201 and the second operation region 302 corresponding to the second input unit 202 are set on the display screen 218. It is to be noted that a coordinate system on the first input unit 201 and the second input unit 202 and a coordinate system on the first operation region 301 and the second operation region 302 are absolute coordinate systems, and each of the coordinates correspond on a one-to-one basis.

It is to be noted that a specific example of the display screen 218 is not limited, however, for example, a Cathode Ray Tube display (CRT display), liquid crystal display, plasma display, and Organic Electro Luminescence display (Organic EL display) may be adopted.

FIG. 4A and FIG. 4B show the correspondence between the position coordinates of the input region of the first input unit 201 and the input region of the second input unit 202 and the position coordinates of the first operation region 301 and the second operation region 302. It is to be noted that, in this example, both of the first input unit 201 and the second input unit 202 are touchpads having the same function and size as each other and are in rectangle shape.

FIG. 4A shows the input region of the first input unit 201 and the input region of the second input unit 202. The input region shown in FIG. 4A has (0, 0) of top-left corner coordinates and (300, 500) of bottom-right corner coordinates.

Furthermore, FIG. 4B shows the first operation region 301 and the second operation region 302 on the display screen 218. Regarding the entire operation region (hereinafter referred to as a "whole operation region"), the top-left corner coordinates are (0, 0) and the bottom-right corner coordinates are (1600, 900). Here, out of the whole operation region, the first input unit 201 corresponds to the first operation region 301 represented by the top-left corner coordinates of (0, 0) and the bottom-right corner coordinates of (800, 900), and the second input unit 202 corresponds to the second operation region 302 represented by the top-left corner coordinates of (800, 0) and the bottom-right corner coordinates of (1600, 900).

It is to be noted that the first operation region 301 and the second operation region 302 are also in the same shape and size. Furthermore, the first operation region 301 and the second operation region 302 are located adjacent to each other so that they are located equally as the first input unit 201 and the second input unit 202, when seen by the user.

The top-left corner coordinates (0, 0) of the first input unit 201 correspond to the top-left corner coordinates (0, 0) of the first operation region 301, and the bottom-right corner coordinates (300, 500) of the first input unit 201 correspond to the bottom-right corner coordinates (800, 900) of the first operation region 301. The correspondence between other coordinates can be calculated by prorating the areas of the first input unit 201 and the first operation region 301. The correspondence between the second input unit 202 and the second operation region 302 are the same as the above.

The input apparatus 203 having the above structure notifies, to the operating apparatus 200, operation information indicating that the user has touched the input region of the first input unit 201 and the input region of the second input unit 202. After obtaining the as operation information, the operating apparatus 200, (i) determines, based on the operation information, the first operation region 301 to be allocated to the first input unit 201 and the second operation region 302 to be allocated to the second input unit 202, and (ii) notifies the result of determination to the display apparatus 219. The display apparatus 219 sets the notified first operation region 301 and the second operation region 302 on the display screen 218, and displays the pointer position corresponding to the touch position by the user. Specific process details are described later.

It is to be noted that FIG. 1 shows an example in which each of the operating apparatus 200, input apparatus 203, and the display apparatus 219 is a separate apparatus. A specific example in this case is, for example, a desktop personal computer (PC) having the input apparatus 203 that is equivalent to, for example, a touchpad or a mouse, the operating apparatus 200 that is equivalent to a body of the computer, and the display apparatus 219 that is equivalent to a display.

However, without being limited to the above example, the operating apparatus 200 may be integrated with the input apparatus 203, the operating apparatus 200 may be integrated with the display apparatus 219, and the operating apparatus 200, input apparatus 203, and the display apparatus 219 may be integrated.

As an example, the input apparatus 203 and the operating apparatus 200 may be integrated by incorporating the operating apparatus 200 in the chassis 220 of the input apparatus 203, and the control information (pointer position coordinates) calculated by such an apparatus may be transmitted to the display apparatus 219. As another example, the display apparatus 219 and the operating apparatus 200 may be integrated by incorporating the operating apparatus 200 in the display apparatus 219, and a display control may be performed by obtaining the operation information from the input apparatus 203 using such an apparatus.

It is to be noted that the chassis 220 and the display apparatus 219 may be connected with a wire, or the chassis 220 may have a remote control signal transmitting unit and transmit a remote control signal to the display apparatus 219 that is physically unconnected. A specific example of the above two examples is, for example, a combination of a remote control (the input apparatus 203) and a TV (the display apparatus 219).

As a yet another example, the input apparatus 203, the operating apparatus 200, and the display apparatus 219 may be integrated by incorporating the operating apparatus 200 in the chassis 220 and locating the display screen 218 on a surface of the chassis 220. A specific example of this example is, for example, a structure having the touchpad and the display screen integrated by piling high-permeability touchpads on the display screen, a structure having display screens located side by side on the touchpad, or a laptop PC.

[Operation]

Figure 5:
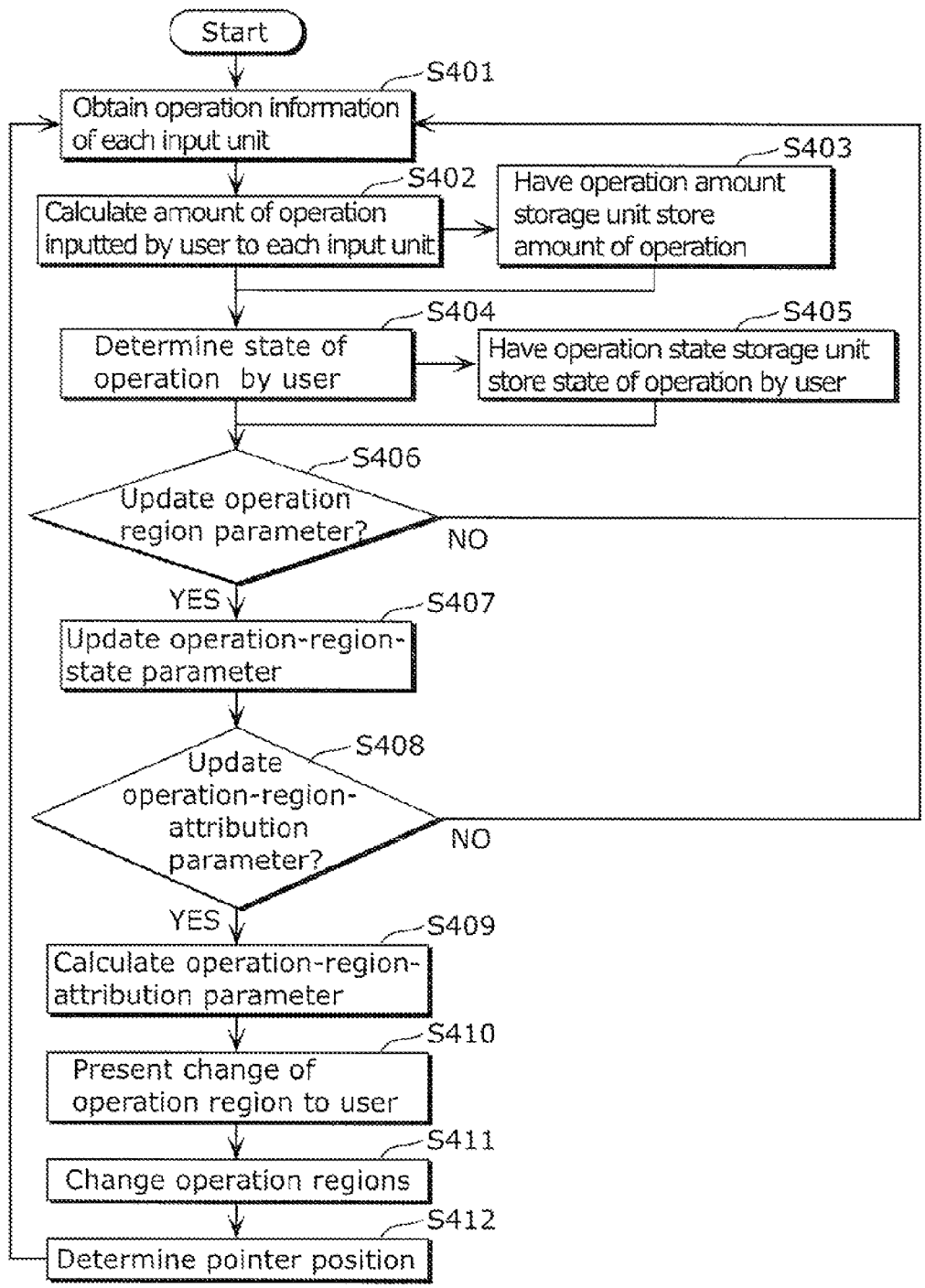
FIG. 5 is a flowchart showing steps of a process of the operating apparatus according to the embodiment of the present invention.

Next, the operation of the operating apparatus 200 according to the embodiment is described with reference to FIG. 5. FIG. 5 is a flowchart showing a performance of the operating apparatus 200. The operating apparatus 200 performs the process (S401 to S412) shown in FIG. 5 using the current operation information obtained every time obtaining the operation information from the input apparatus 203.

First, the operation information obtaining unit 204 of the operating apparatus 200 obtains, from the input apparatus 203, the operation information indicating the operation inputted by the user to the first input unit 201 and the operation information indicating the operation inputted by the user to the second input unit 202 (S401). The operation information includes one or more pieces of information out of the position information (the coordinates of the touch position), the time, and the touch strength on the input region that the user is touching. It is to be noted that, when the touchpad is the capacitance-type touchpad, the touch strength is calculated based on a value of the capacitance. Meanwhile, when the touchpad is of the pressure-sensitive type, the touch strength is calculated based on a value of the pressure.

Figures 6A, 6B, 7:
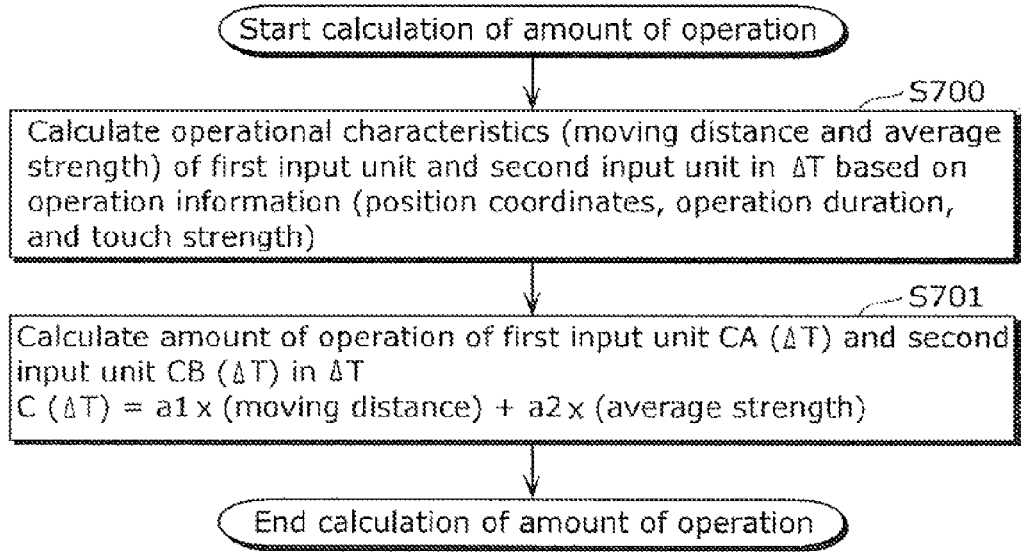
FIG. 6A shows an example of operation information which is generated by the first input unit and obtained by an operation information obtaining unit.
FIG. 6B shows an example of the operation information which is generated by the second input unit and obtained by the operation information obtaining unit.
FIG. 7 is a flowchart describing a process of calculating an amount of the operation according to the embodiment of the present invention.

FIG. 6A shows an example of the operation information which is generated by the first input unit 201 and obtained by the operation information obtaining unit 204. FIG. 6B shows an example of the operation information which is generated by the second input unit 202 and obtained by the operation information obtaining unit 204. In the examples in FIG. 6A and FIG. 6B, the operation information obtaining unit 204 obtains, from the input apparatus 203, the operation information including the coordinates and the touch strength of the touch position in every predetermined time interval.

For example, when referring to the operation information of the first input unit 201 at the time $t_0$, the touch strength is 0 and there is no information on the touch position. In other words, at the time $t_0$, the user is not touching the first input unit 201. Next, with referring to the operation information of the first input unit 201 at the time $t_1$, the coordinates of the touch position are (88, 157) and the touch strength is 11. Furthermore, the touch position and the touch strength of the time $t_2$, $t_3$, and $t_4$ are obtained in the same manner. In addition, regarding the second input unit 202, the operation information generated at each of the time $t_0$ to $t_4$ is obtained in the same manner.

Next, the operation amount calculation unit 205 calculates the amount of the operation inputted by the user to the first input unit 201 and the amount of the operation inputted by the user to the second input unit 202 (S402), using the operation information obtained by the operation information obtaining unit 204. It is to be noted that the operation amount calculation unit 205 (i) calculates operational characteristics that have a different property from each other, based on the operation information, and (ii) calculates a weighted linear sum of predetermined weighting coefficients and the plural operational characteristics, as the amount of the operation. Furthermore, examples of the operational characteristics are the moving distance, the moving velocity, an operation direction, and the average strength. The amounts of the operations according to the embodiment are calculated based on the two operational characteristics, the moving distance and the average strength, of the finger of the user on the first input unit 201 and the second input unit 202.

Details of this process is described using FIG. 7, FIG. 8A, and FIG. 8B.

First, the operation amount calculation unit 205 calculates the operational characteristics (S700), based on the operation information of each of the first input unit 201 and the second input unit 202. More specifically, the operation amount calculation unit 205 (i) obtains, from the operation information obtaining unit 204, the operation information of the first input unit 201 shown in FIG. 6A and the operation information of the second input unit 202 shown in FIG. 6B, and (ii) calculates the operational characteristics in the following method.

For example, a method for calculating the moving distance and the average strength in $\Delta_4$, where $\Delta T_4$ represents duration between the time $t_4$ and the time $t_3$ immediately before the time $t_4$, is described. Regarding the first input unit 201, the position coordinates at the time $t_4$ are (95, 145) and the touch strength is 23, and the position coordinates at the time $t_3$ are (92, 150) and the touch strength is 20. That is, the moving distance is calculated as approximately 6 and the average strength is calculated as 21.5. Equally, regarding the second input unit 202, the moving distance is calculated as 16.8 and the average strength is calculated as 73.5.

Next, the operation amount calculation unit 205 calculates the amount of the operation in $\Delta T_4$ (S701), based on the moving distance and the average strength that are the two operational characteristics. The amount of the operation is calculated by the weighted linear sum using values of each of the operational characteristics and the weighting coefficients corresponding to each of the operational characteristics as a parameter. In other words, the weighting coefficient of the moving distance is presented as a1 and the weighting coefficient of the average strength is presented as a2, and the amount-of-operation C ($\Delta T$) in $\Delta T$ is calculated by the following expression: a1×(moving distance)+a2×(average strength). When both of the a1 and a2 are positive values, the value of the amount of the operation increases as the values of the moving distance and the average strength are greater. For example, when a1 is 10 and a2 is 1, the amount-of-operation C ($\Delta T$) in the duration $\Delta T$ is calculated by the following expression: 10×(moving distance)+(average strength).

Accordingly, the amount of the operation in $\Delta T_4$ of the first input unit 201 is calculated as CA($\Delta T_4$)=(10×6+1×21.5)=81.5, and the amount of the operation in $\Delta T_4$ of the second input unit 202 is calculated as CB($\Delta T_4$)=(10×6.5+1×73.5)=137.5. The amounts of the operations from the time $t_0$ to the time $t_4$ calculated in the above manner are shown in FIG. 8A and FIG. 8B. It is to be noted that the amount of the operation in $\Delta T_1$ that is between the time $t_0$ and the time $t_1$ is not calculated, because the operation information is not obtained at the time $t_0$.

It is to be noted that, in the above example, the moving distance and the average strength are used as the operational characteristics in order to calculate the amount of the operation, however, without being limited to this example, characteristics relevant to operation such as the moving velocity, the moving acceleration velocity, a moving direction, the number of gestural operations, the number of executions of an event (for example, the number of determination operations) may be used. In this case, the amount-of-operation C ($\Delta T_n$) in $\Delta T_n$ (from the time $T_{n-1}$ to $t_n$) can be calculated by the weighted linear sum using m operational characteristics, C1 ($\Delta T_n$) to Cm ($\Delta T_n$), and m weighting coefficients, a1 to am, as the parameter, as shown in the math below.

[Math 1]

$$C(\Delta T_n)=a1 \times C1(\Delta T_n)+a2 \times C2(\Delta T_n)+\ldots+am \times Cm(\Delta T_n) \quad \text{Expression 1}$$

It is to be noted that the amount of the operation in $\Delta T_n$ is calculated based on the operational characteristics obtained during the time $T_{n-1}$ to $t_n$, however, the amount of the operation in $\Delta T_n$ may be calculated based on operational characteristics obtained during a time that precedes the time $T_{n-1}$ by a predetermined duration to $T_n$. In other words, the amount of the operation in $\Delta T_n$ is calculated by substituting the operational-characteristics Cm ($\Delta T_n$) into Cm' ($\Delta T_n$) in the math 1, as shown in the math 2.

[Math 2]

$$Cm'(\Delta T_n)=b1 \times Cm(\Delta T_n)+b2 \times Cm(\Delta T_{n-1})+\ldots+bk \times Cm(\Delta T_{n-k+1}) \quad \text{Expression 2}$$

In other words, the amount of the operation in $\Delta T_n$ is calculated by the weighted linear sum using (i) k operational characteristics obtained during a time $T_{(n-k+1)}$, that precedes the time $T_n$ by a predetermined duration, to $T_n$, and (ii) k positive-weighting-coefficients bk, as the parameter. It is to be noted that the predetermined duration by which the time $T_n$ is preceded may be set according to the operational characteristics by the user and an application to be operated.

Next, the operation amount calculation unit 205 has the operation amount storage unit 206 store the amount of the operation calculated for the first input unit 201 and the amount of the operation calculated for the second input unit 202 (S403). In other words, the operation amount storage unit 206 stores the amount of the operation of the first input unit 201 shown in FIG. 8A and the amount of the operation of the second input unit 202 shown in FIG. 8B.

Next, the operation state determination unit 207 determines the state of the operation by the user of the first input unit 201 and the state of the operation by the user of the second input unit 202 (S404), using the amount of the operation in the predetermined time interval stored in the operation amount storage unit 206. The state of the operation by the user to the first input unit 201 is one of (i) the "operation ON state" indicating that the user is operating the first input unit 201 and (ii) the "operation OFF state" indicating that the user is not operating the first input unit 201. The state of the operation by the user to the second input unit 202 is one of (i) the "operation ON state" indicating that the user is operating the second input unit 202 and (ii) the "operation OFF state" indicating that the user is not operating the second input unit 202.

Figure 9:
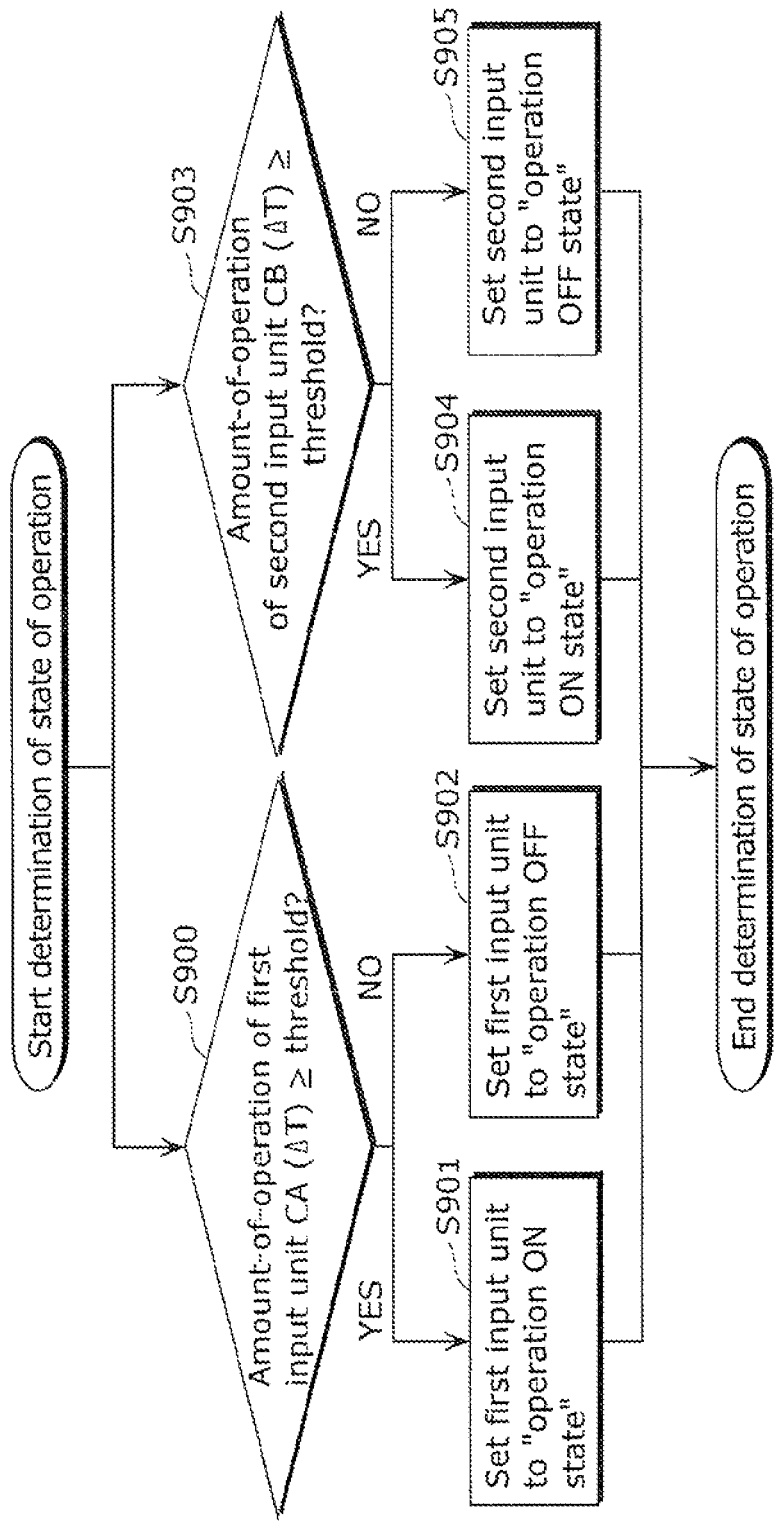
FIG. 9 is a flowchart describing a process of determining a state of the operation according to the embodiment of the present invention.

Steps of this process are described using FIG. 9, FIG. 10A, and FIG. 10B. The weighting coefficients are set so that values of the amounts of the operations are larger when the user is performing a certain operation to the first input unit 201 and the second input unit 202, while the values of the amounts of the operations are smaller when the user is not operating the first input unit 201 and the second input unit 202 or the user is putting the finger on, but not operating, the first input unit 201 and the second input unit 202.

Therefore, the operation state determination unit 207 determines, when the amounts of the operations are equal to or greater than predetermined thresholds (YES in S900 and S903), the states of the operations of the first input unit 201 and the second input unit 202 as the "operation ON state" (S901 and S904). Meanwhile, the state determination unit 207 determines, when the amounts of the operations are below the predetermined threshold (NO in S900 and S903), the states of the operations as the "operation OFF state" (S902 and S905).

For example, a case is assumed that a threshold of a condition for determination is set to 100. Since the amount of the operation of the first input unit 201 in $\Delta T_4$ is CA($\Delta T_4$)=81.5, that is below the threshold (NO in S900), the state of the operation of the first input unit 201 in $\Delta T_4$ is determined as the "operation OFF state" (S902). Meanwhile, since the amount of the operation of the second input unit 202 is CB($\Delta T_4$)=137.5, that is equal to or greater than the threshold (YES in S903), the state of the operation of the second input unit 202 in $\Delta T_4$ is determined as the "operation ON state" (S904). The states of the operation in $\Delta T_1$ to $\Delta T_3$ can also be determined in the same manner.

Next, the operation state determination unit 207 has the operation state storage unit 208 store the result of determination on the state of the operation inputted by the user to the first input unit 201 and the result of determination on the state of the operation inputted by the user to the second input unit 202 (S405). In other words, the state of the operation of first input unit 201 and the state of the operation of the second input unit 202 are stored in the operation state storage unit 208. It is to be noted that the amount of the operation is not calculated in $\Delta T_1$, and the "operation OFF state" is set as the initial state.

The operation region parameter determination unit 209 includes the parameter-update-condition determination unit 210, the operation-region-state parameter update unit 212, and the operation-region-attribution parameter update unit 213. The operation region parameter determination unit 209 determines parameters relevant to the first operation region 301, on the display screen 218, operable by the first input unit 201, and parameters relevant to the second operation region 302, on the display screen 218, operable by the second input unit 202.

First, the operation-region-parameter of the first operation region 301 includes (i) an operation-region-state parameter indicating the state of the first operation region 301 corresponding to the first input unit 201 and (ii) an operation-region-attribution parameter indicating an attribution of the first operation region 301. An operation-region-parameter of the second operation region 302 includes (i) an operation-region-state parameter indicating the state of the second operation region 302 corresponding to the second input unit 202 and (ii) an operation-region-attribution parameter indicating an attribution of the second operation region 302. The operation-region-state parameter is one of (i) the "valid state" indicating that the input to the input region can be reflected on the corresponding operation region or (ii) the "invalid state" indicating. that the input to the input region cannot be reflected on the corresponding operation region. Furthermore, the operation-region-attribution parameter includes one or more pieces of information out of the area, the shape, the location of the operation region. The operation-region-attribution parameter may also include the changing velocity as well as the changing method of the area, the shape, and the location, of the operation region.

The outline of the steps of the process of the operation region parameter determination unit 209 is described.

The parameter-update-condition determination unit 210 determines whether or not to update the operation region parameter (S406), based on the state of the operation of the first input unit 201 and the state of the operation of the second input unit 202 determined by the operation state determination unit 207. Subsequently, when it is determined "to update" the operation region parameter (YES in S406), the operation-region-state parameter update unit 212 updates the operation-region-state parameter (S407). Meanwhile, when it is determined "not to update" the operation region parameter (NO in S406), the operation-region-state parameter update unit 212 returns to the step to obtain the operation information (S401).

Next, the operation-region-attribution parameter update unit 213 determines whether or not to update the operation-region-attribution parameter (S408). Subsequently, when it is determined "to update" the operation-region-attribution parameter (YES in S408), the operation-region-attribution parameter update unit 213 calculates the operation-region-attribution parameter (S409). Meanwhile, when it is determined "not to update" the operation-region-attribution parameter (NO in S408), the process returns to the step to obtain the operation information (S401).

Next, detailed processes of each of the parameter-update-condition determination unit 210, the operation-region-state parameter update unit 212, and the operation-region-attribution parameter update unit 213 are described.

Figures 11, 12A:
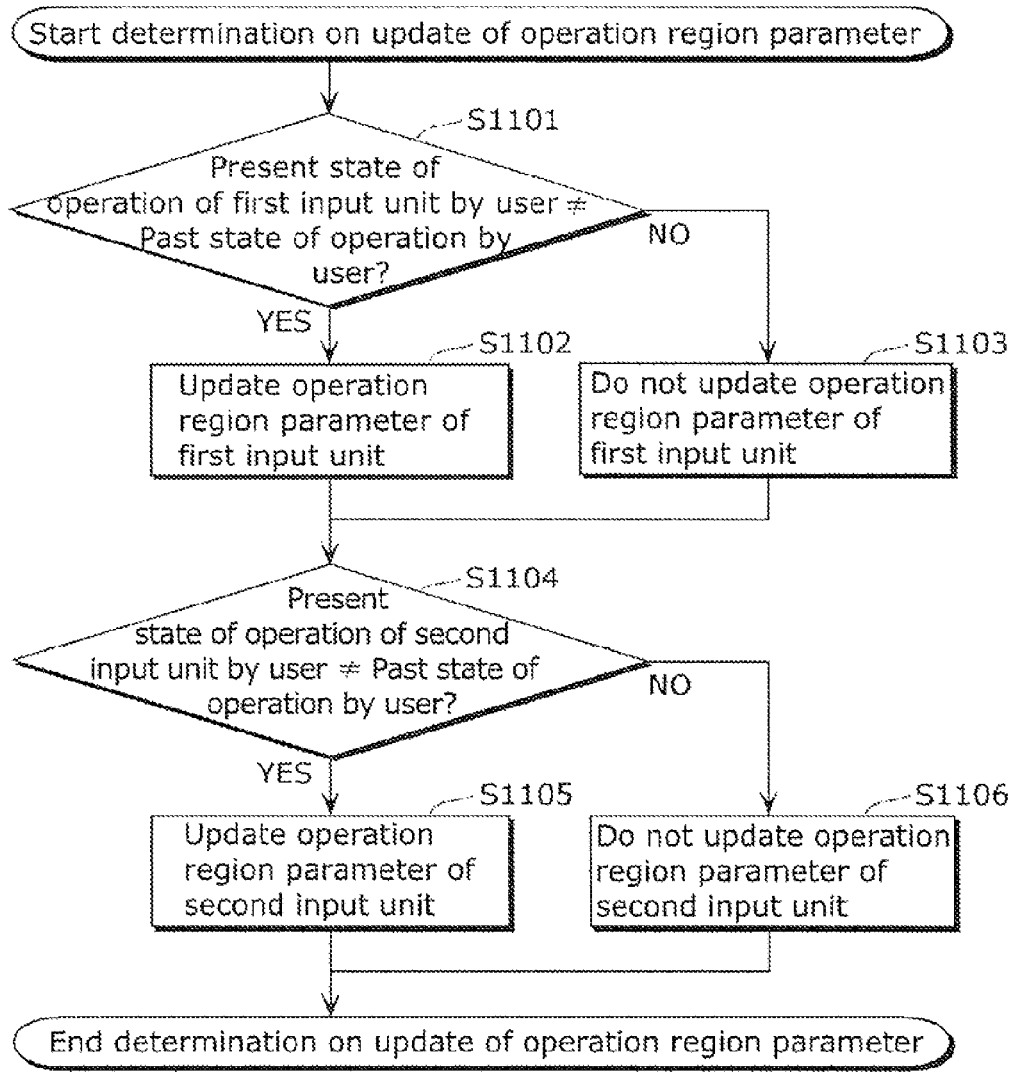
FIG. 11 is a flowchart describing a process of determining an update of an operation region parameter according to the embodiment of the present invention.
FIG. 12A shows examples of the results of determination on the update of the operation region parameter of the first input unit.
Figures 12B, 13:
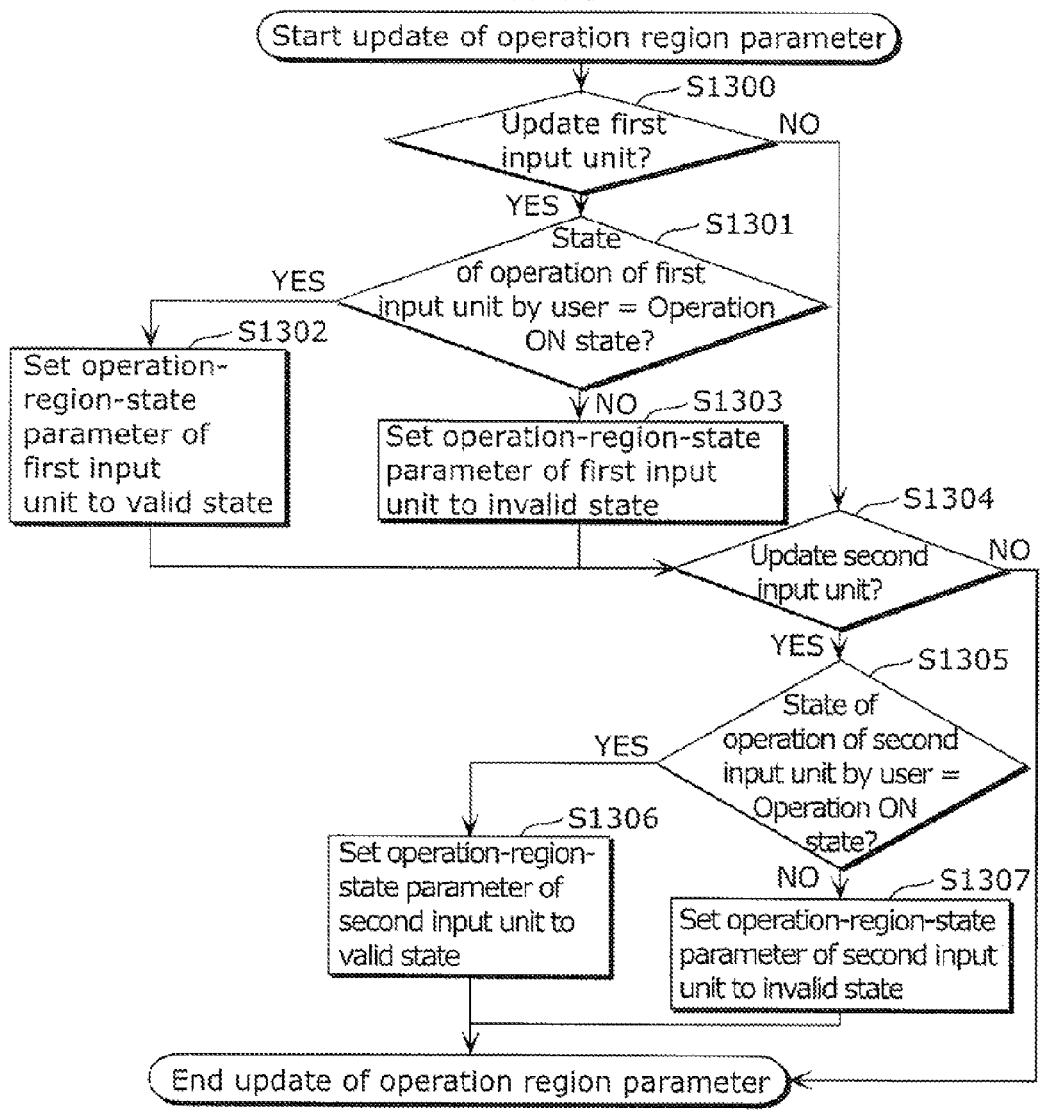
FIG. 12B shows examples of the determination results on the update of the operation region parameter of the second input unit.
FIG. 13 is a flowchart describing a process of updating an operation-region-state parameter according to the embodiment of the present invention.
Figure 15:
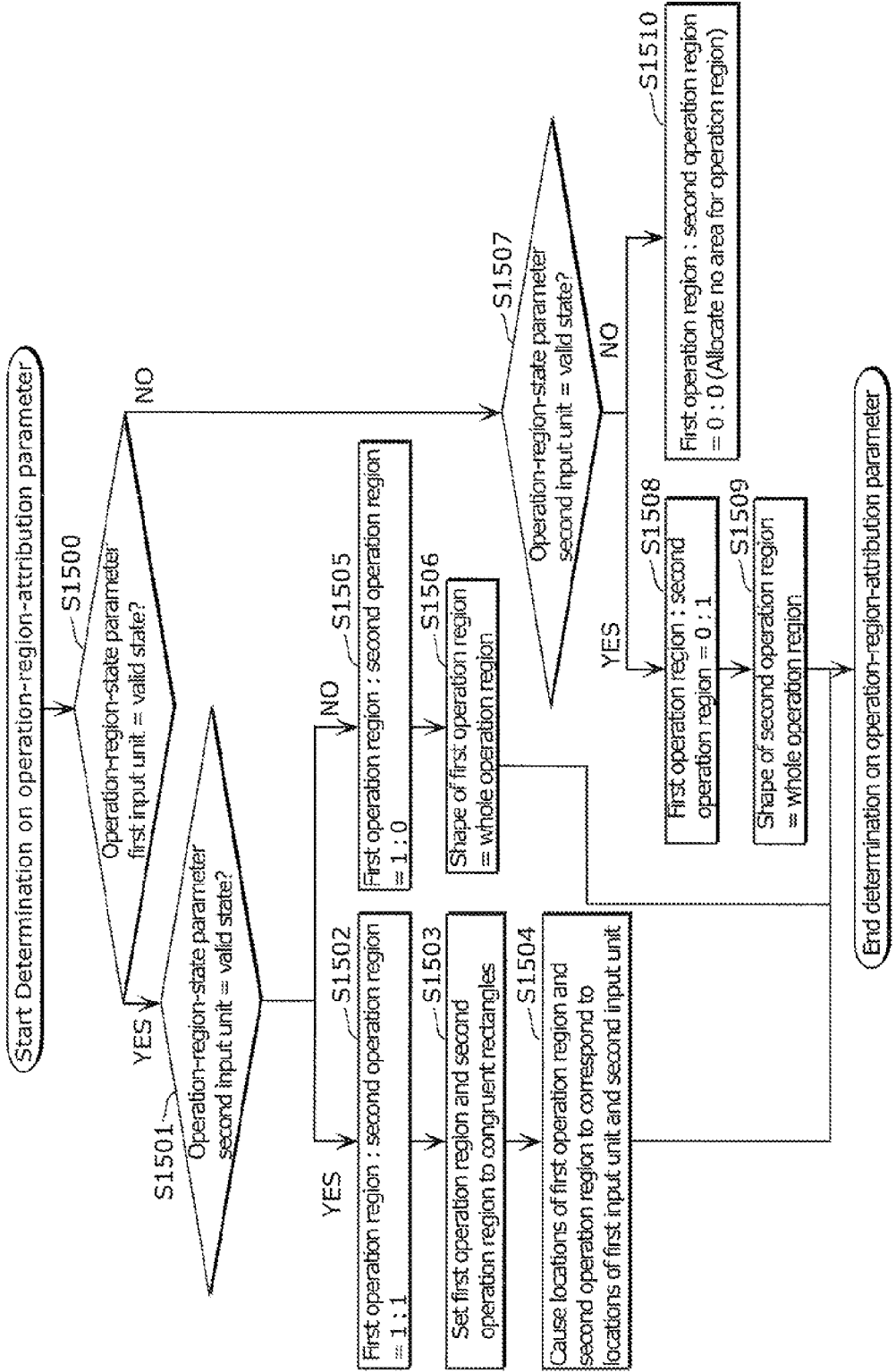
FIG. 15 is a flowchart describing a process of determining an operation-region-attribution parameter according to the embodiment of the present invention.

First, an example of specific steps of the process of the parameter-update-condition determination unit 210 (S406 in FIG. 5) is described using FIG. 11, FIG. 12A, and FIG. 12B.

First, the parameter-update-condition determination unit 210 determines one of "to update" or "not to update" the operation region parameter of the first input unit 201 (S1101), based on the history of the state of the operation by the user to the first input unit 201 stored in the operation state storage unit 208. More specifically, the parameter-update-condition determination unit 210 compares the present state of the operation and the past state of the operation, and when the states are different (YES in S1101), determines "to update" the operation region parameter (S1102). Meanwhile, when the states are the same (NO in S1101), the parameter-update-condition determination unit 210 determines "not to update" the operation region parameter (S1103).

Equally, regarding the second input unit 202, the parameter-update-condition determination unit 210 compares the present operation state of the operation and the past state of the operation, and when the states are different (YES in S1104), determines "to update" the operation region parameter (S1105) while determining "not to update" the operation region parameter when the states are the same (S1106).

In other words, the parameter-update-condition determination unit 210 determines, based on the state of the operation stored in the operation state storage unit 208, "to update" the operation region parameter of the first input unit 201, when a present-operation-state CA ($\Delta T_n$) of the first input unit 201 is different from a past-operation-state CA ($\Delta T_{(n-1)}$) of the first input unit 201. Meanwhile, when CA ($\Delta T_n$) and CA ($\Delta T_{(n-1)}$) are the same, the parameter-update-condition determination unit 210 determines "not to update" the operation region parameter of the first input unit 201. Equally, regarding the input unit 202, the parameter-update-condition determination unit 210 determines "to update" the operation region parameter of the second input unit 202, when the present-operation-state CB ($\Delta T_n$) is different from the past-operation-state CB ($\Delta T_{(n-1)}$). Meanwhile, when CB ($\Delta T_n$) and CB ($\Delta T_{(n-1)}$) are the same, the parameter-update-condition determination unit 210 determines "not to update" the operation region parameter of the second input unit 202.

This process is described using a specific example. A case is assumed that the state of the operations shown in FIG. 10A and FIG. 10B are stored in the operation state storage unit 208. Regarding the first input unit 201, the state of the operation in $\Delta T_2$ is the "operation OFF state" that is the same as the state of the operation in $\Delta T_1$ immediately before. Accordingly, the parameter-update-condition determination unit 210 determines "not to update" the operation region parameter of the first input unit 201 at the time $t_2$. Equally, since the state of the operation in $\Delta T_3$ and the state of the operation in $\Delta T_4$ are the "operation OFF state", the parameter-update-condition determination unit 210 also determines "not to update" the operation region parameter at the time $t_3$ and the time $t_4$.

Next, regarding the second input unit 202, since the state of the operation in $\Delta T_1$ and the state of the operation in $\Delta T_2$ are the "operation OFF state", the parameter-update-condition determination unit 210 determines "not to update" the operation region parameter at the time $t_2$. Meanwhile, since the state of the operation in $\Delta T_3$ is the "operation ON state" and the state of operation in $\Delta T_2$ and the state of operation in $\Delta T_3$ are different, the parameter-update-condition determination unit 210 determines "to update" the operation region parameter at the time $t_3$. Since the state of the operation in $\Delta T_4$ is the "operation ON state" that is the same as the state of the operation in $\Delta T_3$, the parameter-update-condition determination unit 210 determines "not to update" the operation region parameter at the time $t_4$.

With the above steps, the results of determination on the update of the operation region parameter of the first input unit 201 shown in FIG. 12A and the results of determination on the update of the operation region parameter of the second input unit 202 shown in FIG. 12B are obtained. It is to be noted that only the current state of the operation and the immediately-before state of the operation have been compared, however, without being limited to the immediately-before state of the operation, the parameter-update-condition may be set according to a past state of the operation.

Next, an example of specific steps of the process of the operation-region-state parameter update unit 212 (S407 in FIG. 5) is described using FIG. 13, FIG. 14A, and FIG. 14B.

First, regarding the first input unit 201, the operation-region-state parameter update unit 212 updates the operation-region-state parameter to the "valid state" (S1302), when it is determined "to update" the operation-region-state parameter of the first input unit 201 by the parameter-update-condition determination unit 210 (YES in S1300) and the state of the operation by the user is the "operation ON state" (YES in S1301). Meanwhile, when it is determined "to update" the operation-region-state parameter of the first input unit 201 by the parameter-update-condition determination unit 210 (YES in S1300) and the state of the operation by the user is the "operation OFF state" (NO in S1301), the operation-region-state parameter update unit 212 updates the operation-region-state parameter to the "invalid state" (S1303).

Next, following the updating process (S1300 to S1303) of the first input unit 201, the operation-region-state parameter update unit 212 performs the same process to the second input unit 202. In other words, when it is determined "to update" the operation-region-state parameter of the second input unit 202 by the parameter-update-condition determination unit 210 (YES in S1304) and the state of the operation by the user is the "operation ON state" (YES in S1305), the operation-region-state parameter update unit 212 updates the operation-region-state parameter to the "valid state" (S1306). Meanwhile, when it is determined "to update" the operation-region-state parameter of the second input unit 202 by the parameter-update-condition determination unit 210 (YES in S1304) and the state of the operation by the user is the "operation OFF state" (NO in S1305), the operation-region-state parameter update unit 212 updates the operation-region-state parameter to the "invalid state" (S1307).

This process is described using a specific example. FIG. 12A and FIG. 12B show (i) the state of the operation obtained based on the operation information obtained at each time from the time $t_0$ to the time $t_4$ ($t_1$, $t_2$, $t_3$, and $t_4$), and (ii) the determination result on the update of the operation region parameter. The operation-region-state parameter at the time $t_0$ is set to the "invalid state" as the initial state.

Next, regarding the first input unit 201, the state of the operation is determined as the "operation OFF state" in all of $\Delta T_1$ to $\Delta T_4$, and it is determined "not to update" the operation region parameter at all of the times. As a result, the operation-region-state parameter is not updated and the initial state is continued to be the "invalid state".

Meanwhile, regarding the second input unit 202, the state of the operation is determined as the "operation OFF state" in $\Delta T_1$ and $\Delta T_2$, while the "operation ON state" in $\Delta T_3$ and $\Delta T_4$. It is determined "not to update" the operation-region-state parameter in $\Delta T_1$, $\Delta T_2$, and $\Delta T_4$, and "to update" the operation-region-state parameter in $\Delta T_3$. As a result, the operation-region-state parameter update unit 212 maintains, in $\Delta T_1$ and $\Delta T_2$, the operation-region-state parameter as the "invalid state" that is the initial state, and updates the operation-region-state parameter to the "valid state" in $\Delta T_3$. Furthermore, in $\Delta T_4$, the operation-region-state parameter update unit 212 does not update the operation-region-state parameter in $\Delta T_3$ and maintains the "valid state".

With the above steps, the operation-region-state parameter of the first input unit 201 shown in FIG. 14A and the operation-region-state parameter of the second input unit 202 shown in FIG. 14B are obtained.

Next, an example of specific steps of the process of the operation-region-attribution parameter update unit 213 (S409 in FIG. 5) is described using FIG. 15 and FIG. 16A to FIG. 16D.

The operation-region-attribution parameter update unit 213 updates the operation-region-attribution parameters of the first input unit 201 and the second input unit 202, based on a combination of the current operation-region-state parameters of the each of the first input unit 201 and the second input unit 202 updated by the operation-region-state parameter update unit 212. It is to be noted that, as the initial state, the first input unit 201 corresponds to the first operation region 301, and the second input unit 202 corresponds to the second operation region 302.

First, when the operation-region-state parameter of the first input unit 201 is set to the "valid state" (YES in S1500) and the operation-region-state parameter of the second input unit 202 is set to the "valid state" (YES in S1501), the operation-region-attribution parameter update unit 213 (i) determines that both of the first input unit 201 and the second input unit 202 are being operated and (ii) updates the area ratio of the first operation region 301 and the second operation region 302 to 1:1 (S1502). Furthermore, the operation-region-attribution parameter update unit 213 sets the shapes of the first operation region 301 and the second operation region 302 to congruent rectangles (S1503). Furthermore, the operation-region-attribution parameter update unit 213 locates the first operation region 301 and the second operation region 302 to be seen, from the user, in the same manner as the locations of the first input unit 201 and the second input unit 202 when the user holds the chassis 220 with both hands (S1504). The result of the update is shown in FIG. 16A.

Furthermore, when the operation-region-state parameter of the first input unit 201 is set to the "valid state" (YES in S1500) and the operation-region-state parameter of the second input unit 202 is set to the "invalid state" (NO in S1501), the operation-region-attribution parameter update unit 213 determines that only the first input unit 201 is being operated and updates the area ratio of the first operation region 301 and the second operation region 302 to 1:0 (S1505). Furthermore, the operation-region-attribution parameter update unit 213 sets the shape of the first operation region 301 to be the same as the shape of the display screen 218, and sets the first operation region 301 to the entire display screen 218 (whole operation region) (S1506). The result of the update is shown in FIG. 16B.

Furthermore, when the operation-region-state parameter of the first input unit 201 is set to the "invalid state" (NO in S1500) and the operation-region-state parameter of the second input unit 202 is set to the "valid state" (YES in S1507), the operation-region-attribution parameter update unit 213 determines that only the second input unit 202 is being operated and updates the area ratio of the first operation region 301 and the second operation region 302 to 0:1 (S1508). Furthermore, the operation-region-attribution parameter update unit 213 sets the shape of the second operation region 302 to be the same as the shape of the display screen 218, and sets the second operation region 302 to the entire display screen 218 (whole operation region) (S1509). The result of the update is shown in FIG. 16C.

Furthermore, when the operation-region-state parameter of the first input unit 201 is set to the "invalid state" (NO in S1500) and the o operation-region-state parameter of the second input unit 202 is set to the "invalid state" (NO in S1507), the operation-region-attribution parameter update unit 213 determines that none of the first input unit 201 nor the second input unit 202 are being operated and updates the area ratio of the first operation region 301 and the second operation region 302 to 0:0 (S1510). In other words, the operation-region-attribution parameter update unit 213 does not allocate the operation regions to any of the first input unit 201 and the second input unit 202. The result of the update is shown in FIG. 16D.

It is to be noted that, a velocity or a method set in advance based on the states of the operations before and after the change is used for (i) the changing velocity or (ii) the changing method for changing the area, the shape, and the location to the state after the update, out of the operation-region-attribution parameter.

For example, when the operation-region-state parameter of one of the first input unit 201 and the second input unit 202 maintains the "valid state" and the operation-region-state parameter of the other unit is updated from the "valid state" to the "invalid state", in other words, when the operation-region-state parameters are updated from the state shown in FIG. 16A to the state shown in FIG. 16B or FIG. 16C, the operation region change unit 215 sets the changing velocity to V1.

Furthermore, when the operation state parameters of both of the first input unit 201 and the second input unit 202 are updated from the "valid state" to the "invalid state", in other words, when the operation-region-state parameters are updated from the state shown in FIG. 16A to the state shown in FIG. 16D, the operation region change unit 215 sets the changing velocity to V2.

Furthermore, when the operation-region-state parameter of one of the first input unit 201 and the second input unit 202 maintains the "valid state" and the operation-region-state parameter of the other unit is updated from the "invalid state" to the "valid state", in other words, when the operation-region-state parameters are updated from the state shown in FIG. 16B or FIG. 16C to the state shown in FIG. 16A, the operation region change unit 215 sets the changing velocity to V3.

Furthermore, when the operation-region-state parameter of one of the first input unit 201 and the second input unit 202 is updated from the "valid state" to the "invalid state", and the operation-region-state parameter of the other unit is updated from the "invalid state" to the "valid state", in other words, when the operation-region-state parameters are updated from the state shown in FIG. 16B or FIG. 16C to the state shown in FIG. 16A, the operation region change unit 215 sets the changing velocity to V4.

Furthermore, when the operation-region-state parameter of one of the first input unit 201 and the second input unit 202 is updated from the "valid state" to the "invalid state", and the operation-region-state parameter of the other unit maintains the "invalid state", in other words, when the operation-region-state parameters are updated from the state shown in FIG. 16B or FIG. 16C to the state shown in FIG. 16D, the operation region change unit 215 sets the changing velocity to V5.

Furthermore, when the operation-region-state parameters of both of the first input unit 201 and the second input unit 202 are updated from the "invalid state" to the "valid state", in other words, when the operation-region-state parameters are updated from the state shown in FIG. 16D to the state shown in FIG. 16A, the operation region change unit 215 sets the changing velocity to V6.

Furthermore, when the operation-region-state parameter of one of the first input unit 201 and the second input unit 202 maintains the "valid state" and the operation-region-state parameter of the other unit is updated from the "invalid state" to the "valid state", in other words, when the operation-region-state parameters are updated from the state shown in FIG. 16B or FIG. 16C to the state shown in FIG. 16A, the operation region change unit 215 sets the changing velocity to V7.

It is to be noted that all of the values of the changing velocities V1 to V7 may differ from each other or some of them may be the same. When the changing velocity is very fast, the user feels a sudden change in the areas of the operation regions. When the changing velocity is slow, the user feels a gradual expansion or reduction in the areas of the operation regions.

Furthermore, regarding the changing method, the operation region change unit 215 changes the areas in a way that the areas are gradually expanded or reduced.

It is to be noted that the changing method and the changing velocity have been changed based on the state of the operation, however, without being limited to this method, the changing method and the changing velocity may also be determined based on the amount of the operation.

It is to be noted that when one operation-region-state parameter is set to the "valid state" and another operation-region-state parameter is set to the "invalid state", in other words, when the parameters are in the state shown in FIG. 16B or FIG. 16C, the operation region change unit 215 has (i) allocated the whole operation region to the unit in the "valid state" out of the first input unit 201 and the second input unit 202 and (ii) changed the area of the operation region of the unit in the "invalid state" to 0, however, without being limited to the above, the operation region change unit 215 may (i) not change the area of the operation region of the unit in the "valid state" and (ii) deactivate the input operation of the unit in the "invalid state" so that the operation is not reflected on the operation region, as shown in FIG. 16A.

It is to be noted that only the immediately-before state of the operation has been used for the comparison of the states of the operation, however, the present state of the operation may be o determined based on the change of the state of the operation during a time, that precedes an immediately-before time point by a predetermined duration, to the present.

It is to be noted that, when the operation-region-state parameters of both of the first input unit 201 and the second input unit 202 are in the "valid state" (YES in S1500 and YES in 1501), the operation region change unit 215 has changed the area ratio of the first operation region 301 and the second operation region 302 to 1:1 (S1502), however, without being limited to the above, the area ratio may be changed based on the ratio of the amounts of the operations. In other words, when the amount of the operation of the first input unit 201 is CA and the amount of the operation of the second input unit 202 is CB, the area ratio of the first operation region 301 and the second operation region 302 may be changed to CA:CB. However, it is not necessary to exactly match the ratio of the areas of the first operation region 301 and the second operation region 302 and the ratio of the amounts of the operations, and it is sufficient to control the ratio of the areas of the operation regions to be close to the ratio of the amounts of the operations.

That is the description on the process of the operation region parameter determination unit 209.

Next, the operation-region-change presentation unit 214 presents that the operation region is changed to the user (S410), when the parameter-update-condition determination unit 210 determines to update the operation region parameter. The method of presentation is not specifically limited, however, for example, the operation-region-change presentation unit 214 presents the change using visual information or acoustic information through the display apparatus 219. An example of presentation using the visual information is described using (a) to (d) in FIG. 17. It is to be noted that (a) to (d) in FIG. 17 show an example of a case that both of the first input unit 201 and the second input unit 202 are in the "valid state" before the update of the operation region parameter, and the first input unit 201 is changed to be in the "invalid state" after the update.

In (a) in FIG. 17, the operation-region-change presentation unit 214 displays a popup on the display screen 218 and presents a message saying that the correspondence between the input regions and the operation regions is to be changed. For example, the operation-region-change presentation unit 214 presents words that say "The first input unit 201 is to be invalidated". The popup is removed immediately before or immediately after the update of the operation region parameter. It is to be noted that other words may also be used.

In (b) in FIG. 17, the operation-region-change presentation unit 214 displays a guide that schematically describes the chassis 220, the first input unit 201, and the second input unit 202, and presents the correspondence between the first input unit 201 and the second input unit 202, and the first operation region 301 and the second operation region 302.

In (c) in FIG. 17, the operation-region-change presentation unit 214 displays a border of the first operation region 301 and the second operation region 302. For example, a process that the second operation region 302 is expanded and the first operation region 301 is reduced may be described by an animation such as the border gradually moves to the left.

In (d) in FIG. 17, the operation-region-change presentation unit 214 colors the backgrounds of the first operation region 301 and the second operation region 302 with different colors. The process of the update may be described by the animation, in the same manner as shown in (c) in FIG. 17.

It is to be noted that an example of the method for presenting the change of the operation region parameter using the visual information has been described, however, the acoustic information may also be used. For example, there is a method to have the operation-region-change presentation unit 214 output, before the update, audio information that says "The first input unit 201 is to be invalidated". The words are not limited to the above. Furthermore, the method for presenting the change of the operation regions is also not limited to the above examples, and other methods of description may also be used. Furthermore, a combination of methods of presentation may be used.

Next, the operation region change unit 215 changes, based on the operation region parameters, the correspondence between the first input unit 201 and the second input unit 202, and the first operation region 301 and the second operation region 302 (S411). More specifically, the operation regions are changed by changing the top-left corner coordinates and the bottom-right corner coordinates of each of the operation regions.

Steps of the process of the operation region change unit 215 are described using FIG. 16A to FIG. 16D.

A case is assumed that the operation region parameter is updated and, for example, the operation regions are updated from the state shown in FIG. 16A to the state shown in FIG. 16B. The coordinates of the whole operation region in this case is shown in FIG. 16B. That is, the whole operation region is rectangle and the top-left corner coordinates of the operation region are (0, 0) and the bottom-right corner coordinates of the operation region are (1600, 900). Before the update of the operation region parameter, the top-left corner coordinates and the bottom-right corner coordinates of the first operation region 301 are (0, 0) and (800, 900), respectively, and the top-left corner coordinates and the bottom-right corner coordinates of the second operation region 302 are (800, 0) and (1600, 900), respectively.

Here, when the operation regions are changed from the state shown in FIG. 16A to the state shown in FIG. 16B, in response to that change, the operation region change unit 215 changes the top-left corner coordinates and the bottom-right corner coordinates of the first operation region 301 to (0, 0) and (1600, 900), respectively, and changes the coordinates of the second operation region 302 to "none", without setting each coordinates. As a result, the operation region change unit 215 nulls the second operation region 302 and changes the whole operation region to the first operation region 301 (in other words, the operation region change unit 215 matches the first operation region 301 with the whole operation region). Equally, regarding other changes from a state to another state, the operation regions are changed by changing the top-left corner coordinates and the bottom-right corner coordinates of each of the operation regions.

Next, the pointer position determination unit 216 determines a pointer position on the GUI screen displayed on the display screen 218 or an object pointed by the pointer position (S412), based on (i) the position information outputted from the each of the first input unit 201 and the second input unit 202 and (ii) the operation region calculated by the operation region change unit 215.

Figure 18:
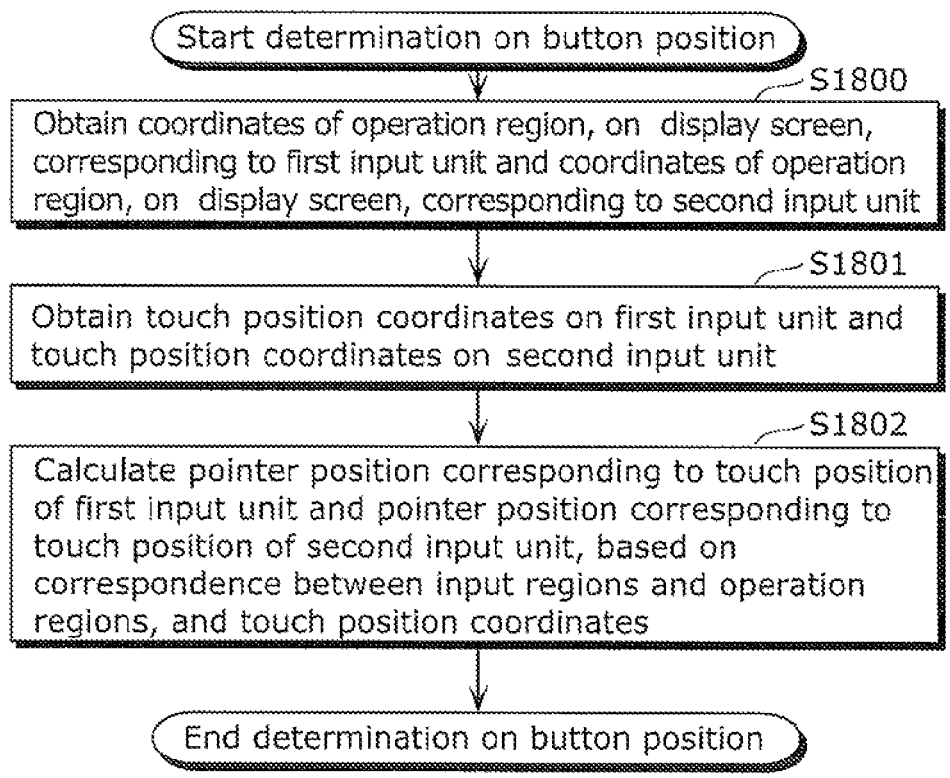
FIG. 18 is a flowchart describing a process of determining a pointer position according to the embodiment of the present invention.

An example of specific steps of the process of determining the pointer position (S412 in FIG. 5) is described using FIG. 18.

First, the pointer position determination unit 216 obtains coordinates of the operation region, on the display screen 218, corresponding to the input region of the first input unit 201 and coordinates of the operation region, on the display screen 218, corresponding to the input region of the second input unit 202 (S1800). Next, the pointer position determination unit 216 obtains coordinates of the touch position by the user on the first input unit 201 and coordinates of the touch position by the user on the second input unit 202 (S1801). Subsequently, the pointer position determination unit 216 calculates the pointer position that corresponds to the touch position of the first input unit 201 and the pointer position that corresponds to the touch position of the second input unit 202, based on the correspondence of (i) the input regions and the operation regions and (ii) the touch position coordinates (S1802).

A specific example of a method for determining the pointer position is described using FIG. 19A, FIG. 19B, FIG. 20A and FIG. 20B.

Figure 19A:
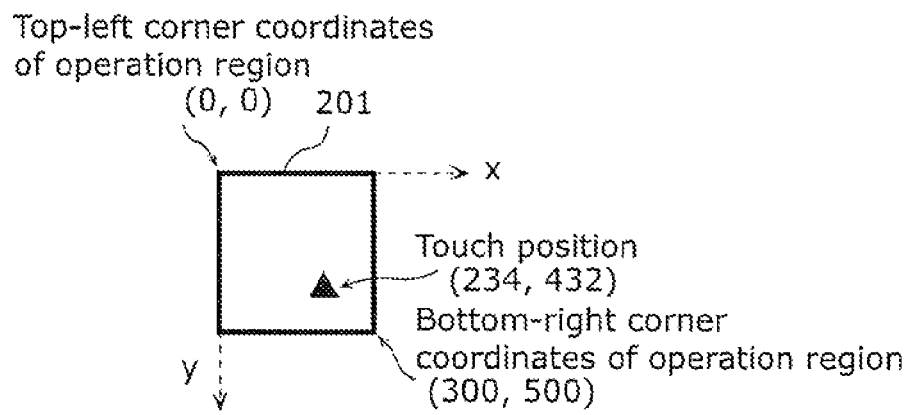
FIG. 19A shows the input region and a touch position of the first input unit.
Figure 19B:
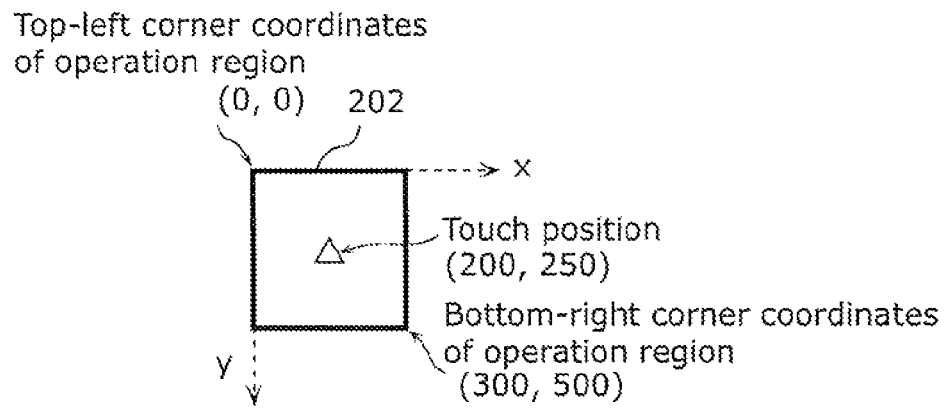
FIG. 19B shows the input region and the touch position of the second input unit.
Figure 20A:
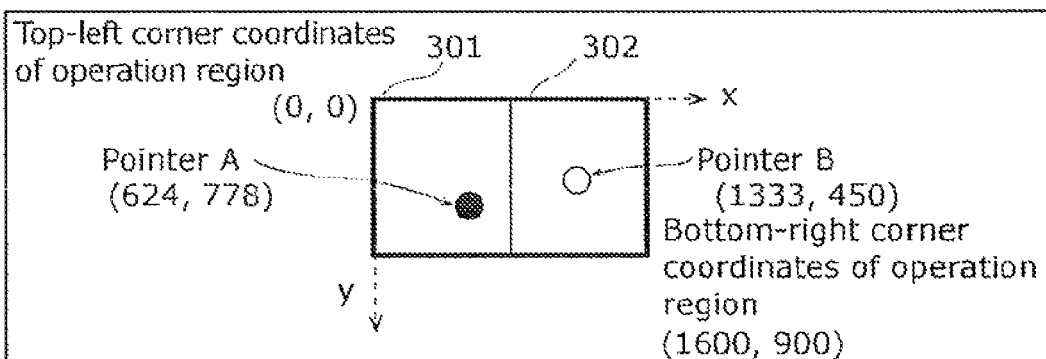
FIG. 20A shows an example of a relationship between the touch position and the pointer position when the first input unit is in the "valid state" and the second input unit is in the "valid state".

FIG. 19A shows the input region and the touch position of the first input unit 201. FIG. 19B shows the input region and the touch position of the second input unit 202. The each of the input regions is in the same size and shape, and the top-left corner coordinates and the bottom-right corner coordinates of the input regions are (0, 0) and (300, 500), respectively. A case is assumed that the user has touched the first input unit 201 and the touch position coordinates are (234, 432). Furthermore, the user has also touched the second input unit 202 and the touch position coordinates are (200, 250).

When the operation regions before the update of the operation region parameter is as shown in FIG. 16A, the top-left corner coordinates and the bottom-right corner coordinates of the first operation region 301 are (0, 0) and (800, 900), respectively, and the top-left corner coordinates and the bottom-right corner coordinates of the second operation region 302 are (800, 0) and (1600, 900), respectively.

The pointer positions are points, on the display screen 218, that correspond to the touch positions by the user on the first input unit 201 and the second input unit 202. That is, the pointer positions can be calculated by converting an input region coordinate system into an operation region coordinate system on the display screen 218.

More specifically, regarding the first operation region 301, when the position corresponding to the touch position by the user is represented by a pointer A and the coordinates of the pointer A are (xpA, ypA), the pointer position can be calculated by the following expression: xpA=234÷300×800=624, ypA=432÷500×800≈778. Equally, regarding the second operation region 302, when the position corresponding to the touch position by the user is represented by a pointer B and the coordinates of the pointer B are (xpB, ypB), the pointer position can be calculated by the following expression: xpB=(200÷300×800)+800≈1333, ypB=250÷500×800≈450. That is, the touch position on the first input unit 201 shown in FIG. 19A is determined to be the position of the pointer A shown in FIG. 20A. Equally, the touch position on the second input unit 202 shown in FIG. 19B is determined to be the position of the pointer B shown in FIG. 20A.

Next, a case is assumed that the operation region parameter is updated and the operation regions are updated from the state shown in FIG. 16A to the state shown in FIG. 16B. As a result, the second operation region 302 ceases to exist and the pointer disappears. Meanwhile, the position coordinates of the pointer A is required to be changed because the first operation region 301 has been the whole operation region. Equally as the above described calculation of the pointer position before the update, since the top-left corner coordinates and the bottom-right corner coordinates of the first operation region 301 corresponding to the first input unit 201 are (0, 0) and (1600, 900), respectively, when the coordinates of the pointer A is represented by (xpA', ypA'), the pointer position can be calculated by the following expression: xpA'=234÷300×1600=1248, ypA'=ypA=778.

The pointer position determination unit 216 determines the pointer position with the above process, and updates the position of the pointer A from (624, 778) to (1248, 778) and position of the pointer B from (1333, 455) to "none", as shown in FIG. 20B.

Next, the display control unit 217 controls the GUI to be displayed on the display screen 218, based on information outputted from the operation-region-change presentation unit 214 and the pointer position determination unit 216. In other words, the display control unit 217 controls the GUI based on the information presented by the operation-region-change presentation unit 214 and the pointer position calculated by the pointer position determination unit 216. More specifically, the display control unit 217 displays information such as a drawing or a picture representing the pointer itself on the pointer position, or highlights the object pointed by the pointer when there is an object at the pointer position.

In the former case, the display control unit 217 displays the information such as the drawing or the picture representing the pointer at the pointer position calculated by the pointer position determination unit 216. For example, in FIG. 20A, an example is shown that the pointer A is represented by a black circle and the pointer B is represented by a white circle. It is to be noted that, without being limited to the above pointer, other drawings or pictures may be used to represent the pointer position. Alternatively, the pointer position may not be represented by the drawing or the picture of the pointer. For example, when an application for writing letters is being executed, the present pointer position can be presented to the user by displaying an orbit of the pointer position using a dot sequence.

In the latter case, in other words, when there is the object on the pointer position, the display control unit 217 highlights the object pointed by the pointer. A specific method for the above case is described using FIG. 21A to FIG. 21C.

Figure 21C:
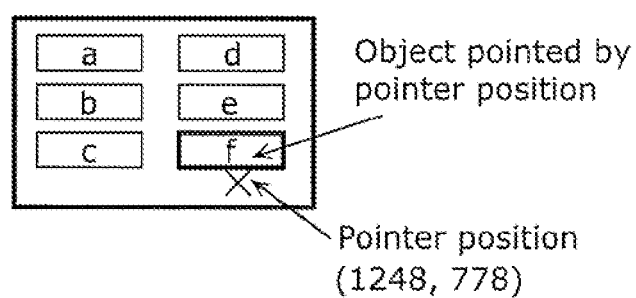
FIG. 21C shows a state that the object f is highlighted.

The display control unit 217 checks whether the pointer position is in an object in the operation region or not, and when the pointer position is there, highlights the object. For example, a case is assumed that there are 6 rectangle objects from object a to object f on the operation region, as shown in FIG. 21A, and each of the objects is located on coordinates shown in FIG. 21B. Furthermore, the position of the pointer A is calculated as (1248, 712). Since the pointer A is included in the region of the object f, the object f is highlighted. For example, the display control unit 217 presents, to the user, that the object f is in a different state than other objects by displaying a peripheral line with a bold line as shown in FIG. 21C, or changing the color, of the region of the object f.

Meanwhile, when the pointer position is not in the object, in other words, when the pointer is in a region with no object, the display control unit 217 may, for example, display the pointer with the drawing or the picture, as shown in FIG. 20B. Alternatively, when the only operation the user can perform on the operation region is the selection of the object, the display control unit 217 may allow one of the objects to be certainly selected, even when the pointer position is in a region out of the region with objects. For example, when the position of the pointer A is calculated as (1248, 778), the pointer is not included in any of the objects, however, the display control unit 217 may determine that the pointer A is within the object f that is the closest to the pointer position and highlight the object f.

It is to be noted that it has been determined to highlight the object which is closest to the pointer position, however, without being limited to the above, the object to be highlighted may be determined by taking, the moving velocity or the moving direction of the pointer, other operation information such as the touch strength, or the state of as the operation, into consideration.

It is to be noted that, as specific examples of highlighting, methods such as displaying the borderline region of the object with a bolder line than other objects, or changing the background color of the object, and blinking the object, are raised, however, the method for highlighting is not limited as long as the object can be distinguished from other objects. Furthermore, a combination of methods for highlighting may be used.

It is to be noted that displaying the pointer position and the highlighting the object may be performed concurrently.

The display screen 218 displays the GUI screen according to the control by the display control unit 217. In other words, the display screen 218 displays a process or result of operation, for example, (i) display of pointers to be operated by the movement of the finger or the hand by the user, using the first input unit 201 and the second input unit 202, or (ii) highlight of an object pointed by the pointers so that the user can distinguish the object from other objects.

With such a structure, operating apparatus 200 determines (i) the state of the operation indicating whether the user is operating or not based on the amount of the operation to the first input unit 201, and determines the operation region to be allocated to the first input unit 201 based on the result of determination, and (ii) the state of the operation indicating whether the user is operating or not based on the amount of the operation to the second input unit 202, and determines the operation region to be allocated to the second input unit 202 based on the result of determination. Thus, it is possible (i) not to assign the operation region to the input unit determined not being operated, even though the unit is being touched, or (ii) to have only the input unit determined being operated be in an operable state.

For example, when the user holds the chassis 220 with both hands in order to operate with stability, and operates only one of the first input unit 201 and the second input unit 202 (the second input unit 202) with the right hand, even when the user is touching the other unit (the first input unit 201) with the left hand unintentionally, the amount of the operation to the first input unit 201 is small and it is determined that the first input unit 201 is not being operated. As a result, it is possible (i) to deactivate the touch to the first input unit 201 due to the hold or (ii) not to allocate the operation region to the first input unit 201 and to assign the whole operation region for the second input unit 202 operated by the right hand.

In other words, the user can hold the chassis 220 freely, without worrying about a position to hold the chassis 220 or an unintended touch to each of the input units. Thus, the user can hold the chassis 220 stably and perform an operation with high accuracy. As a result, the operability of the operating apparatus 200 is improved. Furthermore, the user can put a finger which is not in operation on the input region since it is not determined that the user is operating even when the user puts the finger not in operation on the input region. This alleviates fatigue of the user.

Furthermore, when the operating apparatus 200 determines the operation region based on the history of the states of the operation, for example, even when it is determined that the user is "not operating", the operating apparatus 200 can determine whether the user has stopped operation for a period of time or has operated until immediately before the determination. As described above, by determining based on the movement of the finger or the hand not in a moment but in a certain period of time, for example, it is possible to more accurately recognize whether (i) the user has stopped operation by the non-dominant hand in order to expand the operation region for the dominant hand or not, or (ii) the user has temporarily stopped moving the hand while moving the hand on the input regions. Thus, in the latter case, the operation region is not reduced even when the amount of the operation is reduced temporarily and unintentionally. Therefore, the operability is improved.

(Other Modification Examples)

It is to be noted that the present invention has been described with reference to the foregoing embodiment, however, it should be understood that the present invention is not limited to the above embodiment. The following cases are also included in the present invention.

Each of the apparatuses above is, more specifically, a computer system including, for example, a microprocessor, a ROM, a RAM, a hard disk unit, a display unit, a keyboard, and a mouse. A computer program is stored in the RAM or the hard disk unit. Each of the apparatuses achieves its function through the performance of the microprocessor according to the computer program. Here, the computer program includes a combination of instruction codes indicating commands to a computer in order for achieving a predetermined function.

A part or all of the configurations included in each of the apparatuses above may include a single System Large Scale Integration (System LSI). The system LSI is a super multi-functional LSI produced by integrating configurations onto one chip, and more specifically, a computer system that includes, for example, a microprocessor, a ROM, and a RAM. The computer program is stored in the RAM. The System LSI achieves its function through the performance of the microprocessor according to the computer program.

A part or all of the configurations included in each of the apparatuses above may include an IC card removable from each apparatus or a single body module. The IC card or the module is a computer system which includes, for example, a microprocessor, a ROM, and a RAM. The IC card or the module may include the super multifunctional System LSI described above. The IC card or the module achieves its function through the performance of the microprocessor according to the computer program. The IC card or the module may have a tamper resistant.

The present invention may be a method described above. Furthermore, the present invention may be a computer program which achieves the method through the computer, or a digital signal that includes the computer program.

Furthermore, the present invention may be the computer program or the digital signal recorded in a computer-readable recording medium, for example, a flexible disk, a hard disk, a CD-ROM, an MO, a DVD, a DVD-ROM, a DVD-RAM, a Blu-ray Disc (BD), and a semiconductor memory. Furthermore, the present invention may be the digital signal recorded in the above recording medium.

Furthermore, the present invention may be the computer program or the digital signal transmitted through, for example, a telecommunications line, a wired or a wireless communications line, a network as typified by the Internet, and a data broadcast.

Furthermore, the present invention may be the computer system which includes a microprocessor and a memory, where the above computer program is stored in the memory and the microprocessor performs according to the computer program.

Furthermore, the present invention may be implemented through another independent computer system by transferring the program or the digital signal (i) by recording in the recording medium, or (ii) through, for example, the network.

The above embodiment and the modification examples may be combined respectively.

The embodiment of the present invention has been described with reference to the diagrams, however, the present invention is not limited to the embodiment illustrated. It is possible to add, to the embodiment illustrated, various corrections or modifications along with the full scope of equivalents to the present invention.

INDUSTRIAL APPLICABILITY

An operating apparatus according to the present invention includes input units in a chassis and is useful as an input apparatus of a remote control or an information apparatus for home appliances.

REFERENCE SIGNS LIST

200 Operating apparatus
201 First input unit

202 Second input unit
203 Input apparatus
204 Operation information obtaining unit
205 Operation amount calculation unit
206 Operation amount storage unit
207 Operation state determination unit
208 Operation state storage unit
209 operation region parameter determination unit
210 Parameter-update-condition determination unit
211 operation region parameter update unit
212 Operation-region-state parameter update unit
213 Operation-region-attribution parameter update unit
214 Operation-region-change presentation unit
215 Operation region change unit
216 Pointer position determination unit
217 Display control unit
218 Display screen
219 Display apparatus
220 Chassis
301 First operation region
302 Second operation region

The invention claimed is:

1. An operating apparatus which reflects an operation, inputted by a user to each of a plurality of input units of an input apparatus, on each of a plurality of operation regions that corresponds to each of the input units, the operation regions occupying predetermined areas on a display screen of a display apparatus, said operating apparatus comprising:
an operation information obtaining unit configured to obtain, from the input apparatus, operation information indicating operations inputted by the user to each of the input units;
an operation amount calculation unit configured to calculate an amount of the operations inputted by the user to each of the input units, using the operation information obtained by said operation information obtaining unit and based on operational characteristics obtained between a time and a preceding time that precedes the time by a predetermined duration, the operational characteristics including a moving distance, a moving velocity, a moving acceleration velocity, and an average strength, of the operations inputted with a hand or a finger of the user to each of the input units; and
an operation region change unit configured to change a size of each of the operation regions so that an area of an operation region, of the operating regions, corresponding to an input unit, of the input units, increases as the amount of the operations to the input unit calculated by said operation amount calculation unit is greater.

2. The operating apparatus according to claim 1, wherein said operation region change unit is configured to change, when the amount of the operations to the input unit is below a predetermined threshold, an area of the operation region corresponding to the input unit to 0.

3. The operating apparatus according to claim 1, wherein said operation region change unit is configured to change the size of each of the operation regions so that a ratio of the area of each of the operation regions approximates a ratio of the amount of the operations to each of the input units to which each of the operation regions correspond.

4. The operating apparatus according to claim 1, wherein said operation amount calculation unit is configured to calculate, based on the operation information, a plurality of the operational characteristics that are different in properties from each other, and calculate, as the amount of the operations, a weighted linear sum using predetermined weighting coefficients and the operational characteristics as a parameter.

5. The operating apparatus according to claim 4,
wherein the input unit includes an input region which occupies a predetermined area, and is a touch sensor that outputs, as the operation information, at least one of (i) position coordinates of a position and (ii) a touch strength at the position, on the input region, of a touch by the user on the input region, and
said operation amount calculation unit is configured to calculate, as one of the operational characteristics, (i) at least one of a moving distance, a moving velocity, a moving acceleration velocity, and an operation direction, based on the position coordinates, or (ii) an average strength based on the touch strength.

6. The operating apparatus according to claim 5,
wherein the touch sensor is of a capacitance type, and
the touch strength is a capacitance value obtained when a finger of the user touches or approaches the touch sensor.

7. The operating apparatus according to claim 5,
wherein the touch sensor is of a pressure-sensitive type, and
the touch strength is a pressure value obtained when a finger of the user presses the touch sensor.

8. The operating apparatus according to claim 1, further comprising:
an operation amount storage unit configured to store the amount of the operations calculated by said operation amount calculation unit;
an operation state determination unit configured to determine, based on the amount of the operations stored in said operation amount storage unit, a state of an operation of the input unit to which the operation region corresponds; and
an operation state storage unit configured to store a result of the determination by said operation state determination unit,
wherein said operation state determination unit is configured to determine (i) that the input unit to which the operation region corresponds is in an operation OFF state indicating that the input unit is not being operated, when the amount of the operations is below the predetermined threshold, and (ii) that the input unit to which the operation region corresponds is in an operation ON state indicating that the corresponding input unit is being operated, when the amount of the operations is equal to or greater than the predetermined threshold.

9. The operating apparatus according to claim 8, further comprising:
a parameter-update-condition determination unit configured to determine whether or not an update of an operation-region-state parameter is required, based on the result of the determination by said operation state determination unit, the operation-region-state parameter indicating whether or not an operation inputted by the user to the input apparatus is to be reflected on the corresponding operation region; and
an operation-region-state parameter update unit configured to update the operation-region -state parameter based on the result of the determination by said operation state determination unit, when it is determined by said parameter-update-condition determination unit that the update of the operation-region-state parameter is required,
wherein said parameter -update-condition determination unit is configured to determine that the update of the operation-region-state parameter is required, when results of current and past determinations by said operation state determination unit are different, and said operation-region-state parameter update unit is configured to set: (i) the operation-region-state parameter to a valid state indicating that the input to the input apparatus is to be reflected on the corresponding operation region, when the current result of the determination indicates the operation ON state, and (ii) the operation-region-state parameter to an invalid state indicating that the input to the input apparatus is not to be reflected on the corresponding operation region, when the current result of the determination indicates the operation OFF state.

10. The operating apparatus according to claim 9, further comprising an operation-region-attribution parameter update unit configured to update the operation-region -attribution parameter that includes information indicating at least the area of the operation region, according to a value of the operation-region-state parameter updated by said operation-region-state parameter update unit, wherein said operation-region-attribution parameter update unit is configured to update the operation-region-attribution parameter so that the area of the operation region having the operation-region-state parameter set to the valid state, out of the operation regions, is greater than the area of the operation region having the operation-region-state parameter set to the invalid state, and said operation region change unit is configured to change the size of each of the operation regions according to the values of the operation-region-attribution parameter updated by said operation-region-attribution parameter update unit.

11. The operating apparatus according to claim 10, wherein the operation-region-attribution parameter further includes information indicating (i) a shape, (ii) a position on the display screen, and (iii) a method of changing an area, the shape and the position, of the operation region.

12. The operating apparatus according to claim 10, further comprising an operation-region-change presentation unit configured to notify, to the user, content of the operation-region-attribution parameter updated by said operation-region-attribution parameter update unit.

13. The operating apparatus according to claim 10, wherein said operating apparatus further comprising a pointer position determination unit configured to cause the display apparatus to display a pointer, on a position on the operation region corresponding to the position touched by the user on the input unit, based on a ratio of the area of the operation region indicated in the operation-region-attribution parameter and the area of the input unit corresponding to the indicated operation region.

14. The operating apparatus according to claim 1, further comprising the input apparatus, wherein the input apparatus includes a chassis and the input units located side by side on a same surface of the chassis.

15. The operating apparatus according to claim 1, further comprising the display apparatus.

16. An operating method of reflecting an operation, inputted by a user to each of a plurality of input units of an input apparatus, on each of a plurality of operation regions that corresponds to each of the input units, the operation regions occupying predetermined areas on a display screen of a display apparatus, said operating method comprising:

obtaining, from the input apparatus, operation information indicating the operations inputted by the user to each of the input units;

calculating an amount of the operations inputted by the user to each of the input units, using the operation information obtained in said obtaining and based on operational characteristics obtained between a time and a preceding time that precedes the time by a predetermined duration, the operational characteristics including a moving distance, a moving velocity, a moving acceleration velocity, and an average strength, of the operations inputted with a hand or a finger of the user to each of the input units; and changing a size of each of the operation regions so that an area of an operation region, of the operation regions, corresponding to an input unit, of the input units, increases as the amount of the operations to the input unit calculated in said calculating is greater.

17. A non-transitory computer-readable recording medium for use in a computer, on which a program is recorded, the program causing a computer to execute a process of reflecting an operation, inputted by a user to each of a plurality of input units of an input apparatus, on each of a plurality of operation regions that corresponds to each of the input units, the operation regions occupying predetermined areas on a display screen of a display apparatus, and the program causing the computer to execute:

obtaining, from the input apparatus, operation information indicating operations inputted by the user to each of the input units;

calculating an amount of the operations inputted by the user to each of the input units, using the operation information obtained in said obtaining and based on operational characteristics obtained between a time and a preceding time that precedes the time by a predetermined duration, the operational characteristics including a moving distance, a moving velocity, a moving acceleration velocity, and an average strength, of the operations inputted with a hand or a finger of the user to each of the input units; and changing a size of each of the operation regions so that an area of an operation region, of the operation regions, corresponding to an input unit, of the input units, increases as the amount of the operations to the input unit calculated in said calculating is greater.

18. An integrated circuit which reflects an operation, inputted by a user to each of a plurality of input units of an input apparatus, on each of a plurality of operation regions that corresponds to each of the input units, the operation regions occupying predetermined areas on a display screen of a display apparatus, said integrated circuit comprising:

an operation information obtaining unit configured to obtain, from the input apparatus, operation information indicating operations inputted by the user to each of the input units;

an operation amount calculation unit configured to calculate an amount of the operations inputted by the user to each of the input units, using the operation information obtained by said operation information obtaining unit and based on operational characteristics obtained between a time and a preceding time that precedes the time by a predetermined duration, the operational characteristics including a moving distance, a moving velocity, a moving acceleration velocity, and an average strength, of the operations inputted with a hand or a finger of the user to each of the input units; and an operation region change unit configured to change a size of each of the operation regions so that an area of an operation region, of the operation regions, corresponding to an input unit, of the input units, increases as the amount of the operations to the input unit calculated by said operation amount calculation unit is greater.

* * * * *